United States Patent
Pauzauskie et al.

(10) Patent No.: US 11,757,245 B2
(45) Date of Patent: Sep. 12, 2023

(54) RADIATION-BALANCED FIBER LASER

(71) Applicant: University of Washington, Seattle, WA (US)

(72) Inventors: Peter J. Pauzauskie, Seattle, WA (US); Anupum Pant, Seattle, WA (US); Xiaojing Xia, Seattle, WA (US); Elena Dobretsova, Seattle, WA (US); E. James Davis, Seattle, WA (US); Alexander B. Bard, Seattle, WA (US); Robert G. Felsted, Seattle, WA (US)

(73) Assignee: University of Washington, Seattle, WA (US)

( * ) Notice: Subject to any disclaimer, the term of this patent is extended or adjusted under 35 U.S.C. 154(b) by 212 days.

(21) Appl. No.: 17/160,073

(22) Filed: Jan. 27, 2021

(65) Prior Publication Data

US 2021/0257799 A1    Aug. 19, 2021

Related U.S. Application Data

(60) Provisional application No. 62/966,363, filed on Jan. 27, 2020.

(51) Int. Cl.
*H01S 3/04* (2006.01)
*H01S 3/067* (2006.01)

(52) U.S. Cl.
CPC ........ *H01S 3/0408* (2013.01); *H01S 3/06716* (2013.01)

(58) Field of Classification Search
CPC ................... H01S 3/0408; H01S 3/06716
See application file for complete search history.

(56) References Cited

U.S. PATENT DOCUMENTS

| | | | |
|---|---|---|---|
| 4,042,527 A | 8/1977 | Kano | |
| 4,829,529 A | 5/1989 | Kafka | |
| 5,008,890 A | 4/1991 | McFarlane | |
| 5,555,342 A | 9/1996 | Buchal | |
| 10,770,861 B1 * | 9/2020 | Osinski | H01S 5/041 |
| 10,989,450 B1 * | 4/2021 | Hehlen | H01S 3/025 |
| 11,067,316 B2 * | 7/2021 | Shenhav | F25B 23/003 |

(Continued)

FOREIGN PATENT DOCUMENTS

| | | |
|---|---|---|
| CN | 102494434 A | 6/2012 |
| CN | 103904163 A | 7/2014 |

(Continued)

OTHER PUBLICATIONS

Knall et al., Model of Anti-Stokes Fluorescence Cooling in a Single-Mode Optical Fiber, in Journal of Lightwave Technology, vol. 36, No. 20, pp. 4752-4760, 15 Oct. 15, 2018, doi: 10.1109/JLT.2018.2861367. (Year: 2018).*

(Continued)

*Primary Examiner* — Peter Radkowski
(74) *Attorney, Agent, or Firm* — Christensen O'Connor Johnson Kindness PLLC

(57) ABSTRACT

An apparatus and method for cooling an optical fiber, comprising impinging electromagnetic radiation from a laser on an optical fiber comprising a core, in which the electromagnetic radiation is substantially confined, and a cladding, in thermal communication with the core, configured to provide optically activated cooling of the core via the electromagnetic radiation from the laser.

12 Claims, 11 Drawing Sheets

(56) References Cited

U.S. PATENT DOCUMENTS

| | | | |
|---|---|---|---|
| 11,349,279 B2* | 5/2022 | Osinski | H01S 3/0408 |
| 2003/0207331 A1 | 11/2003 | Wilson | |
| 2010/0193011 A1* | 8/2010 | Mapel | H01L 31/0543 |
| | | | 136/246 |
| 2011/0253197 A1* | 10/2011 | Mapel | H01L 31/055 |
| | | | 359/884 |
| 2012/0147906 A1 | 6/2012 | Williams | |
| 2012/0312028 A1 | 12/2012 | Kashyap | |
| 2013/0320263 A1 | 12/2013 | Riman | |
| 2017/0137684 A1 | 5/2017 | Pauzauskie | |
| 2019/0154316 A1* | 5/2019 | Shenhav | F25D 31/00 |
| 2020/0244038 A1* | 7/2020 | Osinski | H01S 5/347 |

FOREIGN PATENT DOCUMENTS

| | | | | |
|---|---|---|---|---|
| CN | 104730621 A | 6/2015 | | |
| CN | 105116665 A | 12/2015 | | |
| RU | 2007124426 | 1/2009 | | |
| WO | WO-2021080998 A2 * | 4/2021 | ........... | C03C 13/045 |
| WO | WO-2021080998 A3 * | 6/2021 | ........... | C03C 13/045 |

OTHER PUBLICATIONS

Kunigas et al., Simultaneous Use of Time-Resolved Fluorescence and Anti-Stokes Photoluminescence in a Bioaffinity Assay Anal. Chem. 2005, 77, 9, 2826-2834. Publication Date:Mar. 24, 2005. https://doi.org/10.1021/ac048186y (Year: 2005).*

Mobini et al., Laser cooling investigation of a single-mode Yb-doped ZBLAN optical fiber, in Frontiers in Optics 2017, OSA Technical Digest (online) (Optica Publishing Group, 2017), paper JTu3A.8. (Year: 2017).*

Mobini et al., Thermal modeling, heat mitigation, and radiative cooling for double-clad fiber amplifiers, J. Opt. Soc. Am. B 35, 2484-2493 (2018) (Year: 2018).*

Mobini et al., Heat mitigation of a core/cladding Yb-doped fiber amplifier using anti-Stokes fluorescence cooling, J. Opt. Soc. Am. B 36, 2167-2177 (2019) (Year: 2019).*

Peysokhan et al., Measuring quantum efficiency and background absorption of an Ytterbium-doped ZBLAN fiber, in Conference on Lasers and Electro-Optics, OSA Technical Digest (online) (Optica Publishing Group, 2018), paper JW2A.118. (Year: 2018).*

Qin et al., Tuning the upconversion photoluminescence lifetimes of NaYF4:Yb3+, Er3+ through lanthanide Gd3+ doping. Sci Rep 8, 12683 (2018). https://doi.org/10.1038/s41598-018-30983-9 (Year: 2018).*

Villanueva-Delgado et al., Simulating Energy Transfer and Upconversion in β-NaYF4: Yb3+, Tm3+. The Journal of Physical Chemistry C 119, 23648-23657, https://doi.org/10.1021/acs.jpcc.5b06770 (2015). (Year: 2015).*

Xia et al., Design of a radiation-balanced fiber laser via optically active composite cladding materials, J. Opt. Soc. Am. B 36, 3307-3314 (2019) (Year: 2019).*

Muniz-Canovas et al., Ytterbium-doped fiber laser as pulsed source of narrowband amplified spontaneous emission, Sci Rep 9, 13073 (2019). https://doi.org/10.1038/s41598-019-49695-9 (Year: 2019).*

Krishnaiah et al., Development of ytterbium-doped oxyfluoride glasses for laser cooling applications. Sci Rep 6, 21905 (2016). https://doi.org/10.1038/srep21905 (Year: 2016).*

Snitzer, E., et al. "Double clad, offset core Nd fiber laser," Conference Paper. Jan. 1988, <https://www.researchgate.net/publication/263840867>, [Retrieved Apr. 10, 2017], 5 pages.

Sugiyama, Akira, et al. "Spectroscopic properties of Yb doped YLF grown by a vertical Bridgman method." Journal of alloys and compounds 408 (2006): 780-783.

Teufel, John D., et al. "Sideband cooling of micromechanical motion to the quantum ground state." Nature 475.7356 (2011): 359-363.

Treharne, R. E., et al. "Optical design and fabrication of fully sputtered CdTe/CdS solar cells." Journal of Physics Conference Series. Vol. 286. No 1. IOP Publishing, 2011.

Urton, James, "Laser allows solid-state refrigeration of asemiconductor material," UW News, Jun. 23, 2020, <https://www.washington.edu/news/2020/06/23/laser-refrigeration-semiconductor/> [Retrieved May 26, 2021], 5 pages.

Wang, Xiangru, et al. "Transverse mode competition in gain-guided index antiguided fiber lasers." JOSA B 29.2 (2012): 191-196.

Xia, Xiaojing, et al. "Design of a radiation-balanced fiber laser via optically active composite cladding materials." JOSA B 36.12 (2019): 3307-3314.

Xia, X., et al. "Hydrothermal Synthesis and Solid-State Laser Refrigeration of Ytterbium-Doped Potassium Lutetium Fluoride (KLF) Microcrystals." (2020).

Xia, Xiaojing, et al. "Laser refrigeration of optical fibers via optically-active composite cladding materials." Photonic Heat Engines: Science and Applications. vol. 10936. International Society for Optics and Photonics, 2019.

Xue, Dong. "Three-dimensional simulation of the temperature field in high-power double-clad fiber laser." Optik 122.10 (2011): 932-935.

Yeh, D C., et al. "Intensity-dependent upconversion efficiencies of Er3+ ions in heavy-metal fluoride glass" Journal of applied physics 69.3 (1991): 1648-1653.

Yoneda, Hitoki, Kazuhiko Yamaguchi, and Ken-ichi Ueda. "Dispersion of optical refractive index of Yb3+-doped laser glass and their fitting to Lorentzian model" Jpn J. Appl. Phys., vol. 38 (1999), pp L 639-L 641.

Zander, Christoph, and Kari Heinz Drexhage. "Cooling of a dye solution by anti-Stokes fluorescence." Advances in photochemistry 20 (1995): 59-78.

Zhang, Shubin, et al. "Progress in laser cooling semiconductor nanocrystals and nanostructures." NPG Asia Materials 11 (2019): 1-19.

Zhong, Biao, et al. "Laser cooling of the Yb3+-doped LuLiF4 single crystal for optical refrigeration." Journal of Luminescence 226 (2020): 117472.

Zhou, Pu, et al. "High-power fiber lasers based on tandem pumping." JOSA B 34.3 (2017): A29-A36.

Zhou, Xuezhe, et al. "Laser refrigeration of ytterbium-doped sodium-yLliium-fluoride nanowires." Advanced Materials 28 (2016): 8658-8662.

Zhu, Xiushan, and N. Peyghambarian. "High-power ZBLAN glass fiber lasers: review and prospect." Advances in OptoElectronics 2010 (2010).

Einstein, Albert. "Zur elektrodynamik bewegter korper." Annalen der physik 4 (1905), pp. 891-921.

Pringsheim, P. "Zwei Bemerkungen uber den Unterschied von Lumineszenz- und Temperaturstrahlung." Z. Physik 57, 739-746 (1929). https://doi.org/10.1007/BF01340652.

Liberty et al., "Randomized algorithms for the low-rank approximation of matrices", Proceedings of the National Academy of Sciences of the United States of America (2007), 20 pages. www.pnas.org/cgi/doi/10.1073/pnas.0709640104.

Snyder, "Optical Waveguide Theory," Springer, <https://www.springer.com/gp/book/9780412099502>, accessible on Jun. 25, 2021, Part I: Ray Analysis of Multimode Optical Waveguides, 9 pages.

Allen, Theresa M., Mark F. Buehler, and E. James Davis. "Radiometric effects on absorbing microspheres." Journal of colloid and interface science 142.2 (1991): 343-356.

Pini, Valerio, et al. "Shedding light on axial stress effect on resonance frequencies of nanocantilevers." ACS nano 5.6 (2011): 4269-4275.

A. Ashkin (Jan. 1970) "Acceleration and trapping of particles by radiation pressure," Physical Review Letters, 24(4):156-159.

A. Ashkin et al. (May 1986) "Observation of a single-beam gradient force optical trap for dielectric particles," Optics Letters, 11(5):288-290.

A. Ashkin and J. Dziedzic (Oct. 1989) "Internal cell manipulation using infrared laser traps," Proceedings of the National Academy of Sciences USA, 86(20):7914-7918.

(56) References Cited

OTHER PUBLICATIONS

A. Ashkin et al. (Dec. 1987) "Optical trapping and manipulation of single cells using infrared laser beams," Nature, 330(6150):769-771.

A. Ashkin and J. Dziedzic (Mar. 1987) "Optical trapping and manipulation of viruses and bacteria," Science, 235(4795):1517-1520.

H. Liang et al. (Jan. 1993) "Micromanipulation of chromosomes in PTK2 cells using laser microsurgery (optical scalpel) in combination with laser-induced optical force (optical tweezers)," Experimental cell research, 204(1):110-120.

N. Charon et al. (Feb. 1992) "Morphology and dynamics of protruding spirochete periplasmic flagella," Journal of Bacteriology, 174(3):832-840.

PJ Pauzauskie et al. (Feb. 2006) "Optical trapping and integration of semiconductor nanowire assemblies in water," Nature Materials, 5(2):97-101.

C. Xie et al. (Feb. 2002) "Near-infrared Raman spectroscopy of single optically trapped biological cells," Optics Letters, 27(4):249-251.

LP Neukirch et al. (Aug. 2013) "Observation of nitrogen vacancy photoluminescence from an optically levitated nanodiamond," Optics Letters, 38(16):2976-2979.

LP Ghislain and WW Webb (Oct. 1993) "Scanning-force microscope based on an optical trap," Optics Letters, 18(19):1678-1680.

MJ Sailor and J-H Park (Jul. 2012) "Hybrid Nanoparticles for Detection and Treatment of Cancer," Advanced Materials, 24(28):3779-3802.

Z. Zhang et al. (Jul. 2013) "Near-Infrared Light-Mediated Nanoplatforms for Cancer Thermo-Chemotherapy and Optical Imaging," Advanced Materials, 25(28):3869-3880.

S. Berciaud et al. (Dec. 2004) "Photothermal heterodyne imaging of individual onfluorescent nanoclusters and nanocrystals," Physical Review Letters, 93(25):257402.

EC Dreaden et al. (2012; epub Nov. 2011) "The golden age: gold nanoparticles for biomedicine," Chemical Society Reviews, 41(7):2740-2779.

J. Millen et al. (Jun. 2014) "Nanoscale temperature measurements using non-equilibrium Brownian dynamics of a levitated nanosphere," Nature Nanotechnology, 9(6):425-429.

A. Kyrsting et al. (Feb. 2011) "Heat Profiling of Three-Dimensionally Optically Trapped Gold Nanoparticles using Vesicle Cargo Release," Nano Letters, 11(2):888-892.

OM Maragóet al. (Oct. 2008) "Femtonewton Force Sensing with Optically Trapped Nanotubes," Nano Letters, 8(10):3211-3216.

B. Roy et al. (Jun. 2014) "Simultaneous detection of rotational and translational motion in optical tweezers by measurement of backscattered intensity," Optics Letters, 39(11):3316-3319.

M. Capitanio et al. (Apr. 2002) "Calibration of optical tweezers with differential interference contrast signals," Review of Scientific Instruments, 73(4):1687-1696.

M. Sarshar et al. (Nov. 2014) "Comparative study of methods to calibrate the stiffness of a single-beam gradient-force optical tweezers over various laser trapping powers," Journal of Biomedical Optics, 19(11):115001, 13 pages.

G. Falasco et al. (Sep. 2014) "Effective temperatures of hot Brownian motion," Physical Review E, 90(3):032131, 10 pages.

M. Sheik-Bahae and RI Epstein (Feb. 2009) "Laser cooling of solids," Laser & Photonics Reviews, 3(1-2):67-84.

CE Mungan (Apr. 2005) "Radiation thermodynamics with applications to lasing and fluorescent cooling," American Journal of Physics, 73(4):315-322.

CE Mungan and TR Gosnell (1999; retrieved Apr. 2017) "Laser Cooling of Solids," in B. Bederson and H. Walthier (Eds), Advances in Atomic, Molecular, and Optical Physics, 40:161-228.

C. Li (Feb. 2014) "A targeted approach to cancer imaging and therapy," Nature Materials, 13(2):110-115.

BT Draine and PJ Flatau (Apr. 1994) "Discrete-dipole approximation for scattering calculations," Journal of the Optical Society of America A, 11(4):1491-1499.

JE Baumgardner and DD Osheroff (Oct. 2004) "Phase diagram of superfluid 3He in 99.3% porosity aerogel," Physical Review Letters, 93(15):155301, 4 pages.

DV Seletskiy et al. (Aug. 2010) "Laser cooling of a semiconductor load to 165 K," Optics Express, 18(17):18061-18066.

M. Sheik-Bahae and RI Epstein (Dec. 2007) "Optical refrigeration," Nature Photonics, 1:693-699.

XL Ruan and M. Kaviany (Apr. 2006) "Enhanced laser cooling of rare-earth-ion-doped nanocrystalline powders," Physical Review B, 73:155422, 15 pages.

J. Zhao et al. (Oct. 2013) "Single-nanocrystal sensitivity achieved by enhanced upconversion luminescence," Nature Nanotechnology, 8(10):729-734.

F. Auzel (Oct. 1966) "Quantum counting by energy transfer from ytterbium(III) to thulium(III) in a mixed tungstate and in germanate glass," Comptes Rendus de l'Académie des Sciences Series B, 263B:819-821.

H. Goldenberg and CJ Tranter (1952; retrieved Apr. 2017) "Heat flow in an infinite medium heated by a sphere," British Journal of Applied Physics, 3(9):296-298.

RS Prasher et al. (Nov. 2005) "Nano and micro technology-based next-generation package-level cooling solutions," Intel Technology Journal, 9(4):285-296.

Z. Peng et al. (Aug. 2013) "Lipid bilayer and cytoskeletal interactions in a red blood cell," Proceedings of the National Academy of Sciences USA, 110(33):13356-13361.

TR Costa et al. (Jun. 2015) "Secretion systems in Gram-negative bacteria: structural and mechanistic insights," Nature Reviews Microbiology, 13(6):343-359.

Abramovici, Alex, et al. "LIGO: The laser interferometer gravitational-wave observatory." science 256.5055 (1992): 325-333.

Ashkin, Arthur. "Optical trapping and manipulation of neutral particles using lasers." Proceedings of the National Academy of Sciences 94.10 (1997): 4853-4860.

Balachandran, B., and E. B. Magrab. "Vibrations 2nd edn (Toronto: Cengage Learning)." (2008).

Bensalah, A., et al. "Growth of Yb3+-doped YLiF4 laser crystal by the Czochralski method. Attempt of Yb3+ energy level assignment and estimation of the laser potentiality." Optical Materials 26.4 (2004): 375-383.

Bigotta, Stefano, et al. "Spectroscopic and laser cooling results on Yb 3+-doped Ba Y 2 F 8 single crystal." Journal of applied physics 100.1 (2006): 013109.

Bowman, S. R. "Radiation balanced lasers." Advanced Solid State Lasers. Optical Society of America, 1999.

Bowman, Steven R., Shawn P. O'Connor, and Subrat Biswal. "Ytterbium laser with reduced thermal loading." IEEE journal of quantum electronics 41.12 (2005): 1510-1517.

Braginskii, Vladimir Borisovich, and Anatoliĭ Borisovich Manukin. "Measurement of weak forces in physics experiments" Physics Today 31, 2, 51 (1978).

Brown, David C., and Hanna J. Hoffman. "Thermal, stress, and thermo-optic effects in high average power double-clad silica fiber lasers." IEEE Journal of quantum electronics 37.2 (2001): 207-217.

Chan, Jasper, et al. "Laser cooling of a nanomechanical oscillator into its quantum ground state." Nature 478.7367 (2011): 89-92.

Chen, Guanying, et al. "Core/shell NaGdF4: Nd3+/NaGdF4 nanocrystals with efficient near-infrared to near-infrared downconversion photoluminescence for bioimaging applications." ACS nano 6.4 (2012): 2969-2977.

Clark, J. L., and G. Rumbles. "Laser cooling in the condensed phase by frequency up-conversion." Physical review letters 76.12 (1996): 2037.

Clark, J. L., P. F. Miller, and G. Rumbles. "Red edge photophysics of ethanolic rhodamine 101 and the observation of laser cooling in the condensed phase." The Journal of Physical Chemistry A 102.24 (1998): 4428-4437.

Codemard, Christophe A., Jayanta K. Sahu, and Johan Nilsson. "Tandem cladding-pumping for control of excess gain in ytterbium-doped fiber amplifiers." IEEE journal of quantum electronics 46.12 (2010): 1860-1869.

Coluccelli, Nicola, et al. "Diode-pumped passively mode-locked Yb: YLF laser." Optics express 16.5 (2008): 2922-2927.

(56) References Cited

OTHER PUBLICATIONS

Fan, Tso Yee. "Laser beam combining for high-power, high-radiance sources." IEEE Journal of selected topics in Quantum Electronics 11.3 (2005): 567-577.

Fu, Shijie, et al. "Review of recent progress on single-frequency fiber lasers." JOSA B 34.3 (2017): A49-A62.

Garahan, Anna, et al. "Effective optical properties of absorbing nanoporous and nanocomposite thin films." Journal of applied physics 101.1 (2007): 014320.

Garcia-Meca, Carlos, et al. "On-chip wireless silicon photonics: from reconfigurable interconnects to lab-on-chip devices." Light: Science & Applications 6.9 (2017): e17053-e17053.

Gröblacher, Simon, et al. "Demonstration of an ultracold micro-optomechanical oscillator in a cryogenic cavity." Nature Physics 5.7 (2009): 485-488.

Gupta, Mool C., and John Ballato, eds. The handbook of photonics: Second Edition. CRC press, 2018.

Hansen, Kristian Rymann, et al. "Thermo-optical effects in high-power ytterbium-doped fiber amplifiers." Optics express 19.24 (2011): 23965-23980.

Hehlen, Markus P. "Crystal-field effects in fluoride crystals for optical refrigeration." Laser Refrigeration of Solids III. vol. 7614. International Society for Optics and Photonics, 2010.

Heller, René, Michael Hippke, and Pierre Kervella. "Optimized trajectories to the nearest stars using lightweight high-velocity photon sails." The Astronomical Journal 154.3 (2017): 115.

Hosseini, Mahdi, et al. "Multimode laser cooling and ultra-high sensitivity force sensing with nanowires." Nature communications 5.1 (2014): 1-6.

Jensen, K., Kwanpyo Kim, and A. Zettl. "An atomic-resolution nanomechanical mass sensor." Nature nanotechnology 3.9 (2008): 533-537.

Ke, Wei-Wei, et al. "Thermally induced mode distortion and its limit to power scaling of fiber lasers." Optics express 21.12 (2013): 14272-14281.

Kirk, M. D., T. R. Albrecht, and C. F. Quate "Low-temperature atomic force microscopy." Review of scientific instruments 59.6 (1988): 833-835.

Knall, Jennifer M., Mina Esmaeelpour, and Michel JF Digonnet. "Model of anti-Stokes fluorescence cooling in a single-mode optical fiber." Journal of Lightwave Technology 36.20 (2018): 4752-4760.

Kolkowitz, Shimon, et al. "Coherent sensing of a mechanical resonator with a single-spin qubit." Science 335.6076 (2012): 1603-1606.

Kuznetsov, M. S., et al. "Electronic and thermal refractive index changes in Ytterbium-doped fiber amplifiers." Optics Express 21.19 (2013): 22374-22388.

Landau, L. "On the thermodynamics of photoluminescence." J. Phys.(Moscow), vol. 10, No. 6, (1946), pp. 503-506.

Lee, Jungchul, Fabian Goericke, and William P. King. "Temperature-dependent thermomechanical noise spectra of doped silicon microcantilevers." Sensors and Actuators A: Physical 145 (2008): 37-43.

Li, Yongzhuo, et al. "Room-temperature continuous-wave lasing from monolayer molybdenum ditelluride integrated with a silicon nanobeam cavity." Nature nanotechnology 12.10 (2017): 987-992.

Mahalingam, Venkataramanan, et al. "Structural and optical investigation of colloidal Ln 3+/Yb 3+ co-doped KY 3 F 10 nanocrystals." Journal of Materials Chemistry 19.20 (2009): 3149-3152.

Martin, John H., et al. "3D printing of high-strength aluminium alloys." Nature 549.7672 (2017).

Melgaard, Seth D., et al. "Optical refrigeration to 119 K, below National Institute of Standards and Technology cryogenic temperature." Optics Letters 38.9 (2013): 1588-1590.

Melgaard, Seth D., et al. "Solid-state optical refrigeration to sub-100 Kelvin regime." Scientific reports 6.1 (2016): 1-6.

Meyer, Gerhard. "A simple low-temperature ultrahigh-vacuum scanning tunneling microscope capable of atomic manipulation." Review of Scientific Instruments 67.8 (1996): 2960-2965.

Mobini, Esmaeil, et al. "Thermal modeling, heat mitigation, and radiative cooling for double-clad fiber amplifiers." JOSA B 35.10 (2018): 2484-2493.

Mohammed, Ziad, Hossein Saghafifar, and Mahmood Soltanolkotabi. "An approximate analytical model for temperature and power distribution in high-power Yb-doped double-clad fiber lasers." Laser Physics 24.11 (2014): 115107.

Moore Jr, Glenn E., and Miles V. Klein. "Thermal conductivity of doped and pure cadmium sulfide." Physical Review 179.3 (1969): 722.

Nakayama, Y., Y. Harada, and T. Kita. "An energy transfer accompanied by phonon absorption in ytterbium-doped yttrium aluminum perovskite for optical refrigeration." Applied Physics Letters 117.4 (2020): 041104.

O'Connell, Aaron D., et al. "Quantum ground state and single-phonon control of a mechanical resonator." Nature 464.7289 (2010): 697-703.

Pant, Anupum, et al. "Anti-Stokes laser refrigeration of a nanoscale semiconductor gain medium." Photonic Heat Engines: Science and Applications. vol. 10936. International Society for Optics and Photonics, 2019.

Pant, Anupum, et al. "Optomechanical thermometry of nanoribbon cantilevers." The Journal of Physical Chemistry C 122.13 (2018): 7525-7532.

Pant, Anupum, et al. "Solid-state laser refrigeration of a composite semiconductor Yb: YLiF 4 optomechanical resonator " Nature communications 11.1 (2020): 1-7.

Pant, Anupum, et al. "Solid-state laser refrigeration of a semiconductor optomechanical resonator." arXiv preprint arXiv:1910.02153 (2019).

Park, Young-Shin, and Hailin Wang. "Resolved-sideband and cryogenic cooling of an optomechanical resonator." Mature physics 5.7 (2009): 489-493.

Patterson, W. M., et al. "Measurement of solid-state optical refrigeration by two-band differential luminescence thermometry." JOSA B 27.3 (2010): 611-618.

Pauzauskie, Peter. Laser Refrigeration of Optically-Insulated Cryophotonic Nanocrystals. University of Washington Seattle United States, 2018.

Pirri, Angela, et al. "Direct Comparison of Yb 3+: CaF 2 and heavily doped Yb 3+ YLF as laser media at room temperature." Optics express 17.20 (2009): 18312-18319.

Johnson and Christy 1972, "Optical constants of Ag (Silver)," RefractiveIndex.INFO—Refractive index database, <https://refractiveindexinfo> [retrieved Jul. 6, 2021], 3 pages.

Qiu, Liu, et al. "Laser cooling of a nanomechanical oscillator to its zero-point energy." Physical review letters 124.17 (2020): 173601.

Rahman, ATM Anishur, and P. F. Barker. "Laser refrigeration, alignment and rotation of levitated Yb 3+ YLF nanocrystals." Nature Photonics 11.10 (2017): 634-638.

Reddy, B. R., and P. Venkateswarlu "Infrared to visible energy upconversion in Er3+-doped oxide glass." Applied physics letters 64.11 (1994): 1327-1329.

Richardson, Davis J., John Nilsson, and William A. Clarkson. "High power fiber lasers: current status and future perspectives." JOSA B 27.11 (2010): B63-B92.

Roder, Paden B., et al. "Cold Brownian motion in aqueous media via anti-Stokes photoluminescence." arXiv preprint arXiv:1503.07265 (2015).

Roder, Paden B., et al. "Laser refrigeration of hydrothermal nanocrystals in physiological media." Proceedings of the National Academy of Sciences 112.49 (2015): 15024-15029.

Roder, Paden B., et al. "Laser-refrigeration of rare-earth-doped nanocrystals in water." Laser Refrigeration of Solids VIII. vol. 9380. International Society for Optics and Photonics, 2015.

Roder, Paden B., Peter J. Pauzauskie, and E. James Davis. "Nanowire heating by optical electromagnetic irradiation." Langmuir 28.46 (2012): 16177-16185.

Schwab, Keith C., and Michael L. Roukes. "Putting mechanics into quantum mechanics." Physics Today 58.7 (2005): 36-42.

Seletskiy, Denis V., et al. "Precise determination of minimum achievable temperature for solid-state optical refrigeration." Journal of luminescence 133 (2013).

(56) References Cited

OTHER PUBLICATIONS

Onnes, H.K., "Further experiments with Liquid Helium. D. On the change of Electrical Resistance of Pure Metals at very low Temperatures, etc. V. The Disappearance of the resistance of mercury." Koninklijke Nederlandse Akademie van Wetenschappen, Proceedings Royal Acad. Amsterdam 14 (1911): 113-115.

Kapitza PL (1941) The study of heat transfer in helium II. J Phys USSR 4(1-6):181-210.

Anderson MH, Ensher JR, Matthews MR, Wieman CE, Cornell EA (1995) Observation of Bose-Einstein condensation in a dilute atomic vapor. Science 269(5221):198-201.

Feshchenko AV, Koski JV, Pekola JP (2014) Experimental realization of a Coulomb blockade refrigerator. Phys Rev B 90(20):201407.

Chowdhury I, et al (2009) On-chip cooling by superlattice-based thin-film thermoelecliics. Nat Nanotechnol 4(4):235-238.

Flipse J, Bakker FL, Slachter A, Dejene FK, van Wees BJ (2012) Direct observation of the spin-dependent Peltier effect. Nat Nanotechnol 7(3):166-168.

Bogaerts W, Fiers M, Dumon P (2014) Design challenges in silicon photonics. IEEE J Sel Top Quantum Electron 20(4):1-8.

Vicario C et al. (2013) Pump pulse width and temperature effects in lithium niobate for efficient THz generation Opt Lett 38(24):5373-5376.

Lucchetta EM, Lee JH, Fu LA, Patel NH, Ismagilov RF (2005) Dynamics of *Drosophila embryonic* patterning network perturbed in space and time using icrofluidics. Nature 434(7037):1134-1138.

Lee JH et al. (2013) Regulation of temperature—esponsive flowering by MADS-box transcription factor repressors. Science 342(6158):628-632.

Kucsko G et al. (2013) Nanometre-scale thermometry in a living cell. Nature 500(7460):54-58.

Epstein RI, Buchwald MI, Edwards BC, Gosnell TR, Mungan CE (1995) Observation of laser-induced fluorescent cooling of a solid. Nature 377(6549):500-503.

Mungan CE, Gosnell TR (1996) Comment on "Laser cooling in the condensed phase by frequency upconversion" Phys Rev Lett 77(13):2840.

Rumbles, G., and J. L. Clark. "Rumbles and Clark reply." Physical review letters 77.13 (1996): 2841.

Filho ESdL, Nemova G, Loranger S, Kashyap R (2013) Laser-induced cooling of a Yb:YAG crystal in air at atmospheric pressure. Opt Exp 21(21):24711-24720.

Zhang J, Li D, Chen R, Xiong Q (2013) Laser cooling of a semiconductor by 40 kelvin. Nature 493(7433):504-508.

Arita Y, Mazilu M, Dholakia K (2013) Laser-induced rotation and cooling of a trapped microgyroscope in vacuum. Nat Commun 4(2374).

Palik ED (1998) Handbook of optical constants of solids. (Academic Press) vol. 3.

Chakraborty D et al. (2011) Generalised Einstein relation for hot Brownian motion. Eur Phys Lett 96(6):60009.

Kroy K (2014) Levitating nanoparticles: Non-equilibrium nano-thermometry. Nat Nanotechnol 9(6):415-417.

Hehlen MP, Epstein RI, Inoue H (2007) Model of laser cooling in the Yb3+-doped fluorozirconate glass ZBLAN. Phys Rev B 75(14):144302.

Seletskiy DV, Hehlen MP, Epstein RI, Sheik-Bahae M (2012) Cryogenic optical refrigeration. Adv Opt Photonics 4(1):78-107.

Ashkin A, Schütze K, Dziedzic J, Euteneuer U, Schliwa M (1990) Force generation of organelle transport measured in vivo by an infrared laser trap. Nature. 348:346-348.

Seletskiy DV et al. (2010) Laser cooling of solids to cryogenic temperatures. Nature Photon 4(3):161-164.

Lu C, Huang W, Ni Y, Xu Z (2011) Hydrothermal synthesis and luminescence properties of octahedral LiYb(4):Er(3+) microcrystals. Mat Res Bull 46(2):216-221.

Li D et al. (2012) Direction-specific interactions control crystal growth by oriented attachment. Science 336(6084):1014 1018.

Roder PB, Smith BE, Davis EJ, Pauzauskie PJ (2014) Photothermal heating of nanowires. J Phys Chem C 118(3):1407-1416.

Haro-González P et al. (2013) Optical trapping of NaYF4:Er3+, Yb3+ upconverting fluorescent nanoparticles. Nanoscale 5(24):12192-12199.

Auzel F (2004) Upconversion and anti-Stokes processes with f and d ions in solids. Chem Rev 104(1):139-174.

McLaurin EJ, Bradshaw LR, Gamelin DR (2013) Dual-emitting nanoscale temperature sensors. Chem Mater 25(8):1283-1292.

Wang F, Banerjee D, Liu Y, Chen X, Liu X (2010) Upconversion nanoparticles in biological labeling, imaging, and therapy. Analyst 135(8):1839-1854.

Mor FM, Sienkiewicz A, Forr'o L, Jeney S (2014) Upconversion particle as a local luminescent Brownian probe: A photonic force microscopy study. ACS Photonics 1(12):1251-1257.

Vetrone F et al. (2010) Temperature sensing using fluorescent nanothermometers. ACS Nano 4(6):3254-3258.

Dong GZ, Zhang XL, Li L (2013) Energy transfer enhanced laser cooling in Ho 3+ and Tm 3+-codoped lithium yttrium fluoride. J Opt Soc Am B 30(4):939-944.

Huang H, Delikanli S, Zeng H, Ferkey DM, Pralle A (2010) Remote control of ion channels and neurons through magnetic-field heating of nanoparticles. Nat Nanotechnol 5(8):602-606.

Hodak JH, Fiore JL, Nesbitt DJ, Downey CD, Pardi A (2005) Docking kinetics and equilibrium of a GAAA tetraloop-receptor motif probed by single-molecule FRET. Proc Natl Acad Sci USA 102(30):10505-10510.

Iwaki M, Iwane AH, Ikezaki K, Yanagida T (2015) Local Heat Activation of Single Myosins Based on Optical Trapping of Gold Nanoparticles. Nano Lett 15(4):2456-2461.

Cahill DG et al. (2003) Nanoscale thermal transport. J App Phys 93(2):793-818.

Rings D, Schachoff R, Selmke M, Cichos F, Kroy K (2010) Hot brownian motion. Phys Rev Lett 105(9):090604.

Grier DG (2003) A revolution in optical manipulation. Nature 424(6950):810-816.

Neuman KC, Block SM (2004) Optical trapping. Rev Sci Instrum 75(9):2787-2809.

Tolić-Nerrelykke SF et al. (2006) Calibration of optical tweezers with positional detection in the back focal plane. Rev Sci Instrum 77(10):103101.

Peterman EJ, Gittes F, Schmidt CF (2003) Laser-induced heating in optical traps. Biophys J 84(2):1308-1316.

Berg-Serensen K, Flyvbjerg H (2004) Power spectrum analysis for optical tweezers. Rev. Sci. Instrum. 75(3):594-612.

Rings D, Selmke M, Cichos F, Kroy K (2011) Theory of hot Brownian motion. Soft Matter 7(7):3441.

Hinderliter PM, et al. (2010) ISDD: A computational model of particle sedimentation, diffusion and target cell dosimetry for in vitro toxicity studies. Part. Fibre Toxicol. 7(1):36.

DV Seletskiy et al. (Sep. 2011) Local laser cooling of Yb:YLF to 110 K, Optics Express, 19(19):18229-18236.

EF Nichols and GF Hull (Nov. 1901) "A Preliminary Communication on the Pressure of Heat and Light Radiation," Physical Review (Series I), 13:307-320.

P. Lebedew (Jan.-Jun. 1902) "An Experimental Investigation of the Pressure of Light," The Astrophysical Journal, 15:60-62.

S. Arrhenius (Nov. 1900) "The Cause of the Northern Lights," Physikalische Zeitschrift, (6):81-87.

\* cited by examiner

RADIATION-BALANCED FIBER LASER

CROSS-REFERENCE TO RELATED APPLICATION

This application claims the benefit of U.S. Patent Application No. 62/966,363, filed Jan. 27, 2020, the disclosure of which is hereby incorporated by reference in its entirety.

STATEMENT OF GOVERNMENT LICENSE RIGHTS

This invention was made with government support under Grant No. FA9550-16-1-0362, awarded by the Air Force Office of Scientific Research. The government has certain rights in the invention.

BACKGROUND

Although the output power of commercial fiber lasers has been reported to exceed 500 kW, the heat generated within fiber gain-media has limited the generation of higher laser powers due to thermal lensing and melting of the gain-media at high temperatures.

In general, the key factors limiting the fiber laser performance are thermal management, optical nonlinearity, and damage. Although optical fibers have an excellent ability to dissipate heat due to their large surface area-to-volume ratio, significant heating of the core still occurs during high power operation. For clad-pumped fiber lasers, the thermal damage to the outer polymer cladding is a serious problem limiting the output power. For core-pumped fiber lasers, the degradation of the polymer coating is not as serious of a problem, but thermally induced changes in the refractive index of the fiber leads to a thermal lensing effect, which reduces the effective mode area and results in multi-mode behavior. Such thermally induced mode distortion limits the power scaling of fiber lasers. Current strategies to improve operational performance focus on increasing the material's thermal tolerance, such as using high-temperature polymers, all-glass fibers and new pumping technologies like tandem-pumping to decrease the thermal loading density.

One proposed approach for the development of high-power lasers is radiation balanced lasing based on spontaneous, anti-Stokes photoluminescence. In 1995 Epstein et al. reported the first experimental observation of laser cooling using an amorphous, Yb-doped ZBLAN fluoride glass. ZBLAN materials are sensitive to humidity and lack mechanical strength. Consequently, the most common fiber laser core material is RE-doped silica.

Because of this, optical fibers configured to cool, and methods for cooling optical fibers are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an optical fiber configured to provide optically activated cooling, the optical fiber comprising:
a core configured to substantially confine electromagnetic radiation from a laser; and
a cladding, in thermal communication with the core, configured to provide optically activated cooling of the core via the electromagnetic radiation from the laser is provided.

In another aspect, a method of cooling an optical fiber, comprising impinging electromagnetic radiation from a laser on an optical fiber comprising:
a core, in which the electromagnetic radiation is substantially confined; and
a cladding, in thermal communication with the core, configured to provide optically activated cooling of the core via the electromagnetic radiation from the laser is provided.

In some embodiments, Yb(III) ions within YLiF4 (YLF) microcrystals are used to cool the cladding of optical fibers. In some embodiments, a design for radiation-balanced fiber-lasers using a composite fiber cladding material that incorporates YLF nanocrystals as the active photonic heat engine are disclosed. In some embodiments, the electric-field amplitude within the fiber core is responsible for both the heating of the core, and also the excitation of Yb(III) ions for anti-Stokes laser refrigeration in the cladding. In some embodiments radiation balanced fiber lasers mitigate detrimental thermal effects within fiber gain-media based on using upconverted, anti-Stokes photoluminescence to extract heat from the optical fiber's core. In some embodiments, a fiber laser using optically active nanocrystals within the first cladding layer to extract the heat from the core during optical pumping is disclosed.

In some embodiments a single-mode design for a core pumped fiber-laser cavity that can be cooled through anti-Stokes photoluminescence generated within the fiber's first cladding layer is disclosed. In some embodiments, the cladding material is a composite with Yb:YLF nanocrystals dispersed within the glass host matrix. In some embodiments, the fiber shows a significant temperature decrease of 19 K when the Yb:YLF nanocrystals within the composite cladding have a volume fraction of 10%. The reduced heating of the fiber suggests that pumping the entire cladding may lead to further reductions in temperature. In some embodiments, the core-pumped design the evanescent field from the core is sole source of laser cooling.

BRIEF DESCRIPTION OF DRAWINGS

The foregoing aspects and many of the attendant advantages of this invention will become more readily appreciated as the same become better understood by reference to the following detailed description, when taken in conjunction with the accompanying drawings wherein.

DETAILED DESCRIPTION

The present technology demonstrates an approach to cooling an optical fiber >15K below room temperature using solid state refrigeration.

In one aspect, an optical fiber is provided that is configured to provide optically activated cooling, the optical fiber comprising:

a core configured to substantially confine electromagnetic radiation from a laser; and a cladding, in thermal communication with the core, configured to provide optically activated cooling of the core via the electromagnetic radiation from the laser.

In one aspect, a method of cooling an optical fiber is provided. In one embodiment, the method includes impinging electromagnetic radiation from a laser on an optical fiber comprising:

a core, in which the electromagnetic radiation is substantially confined; and a cladding, in thermal communication with the core, configured to provide optically activated cooling of the core via the electromagnetic radiation from the laser.

Figure 1A:
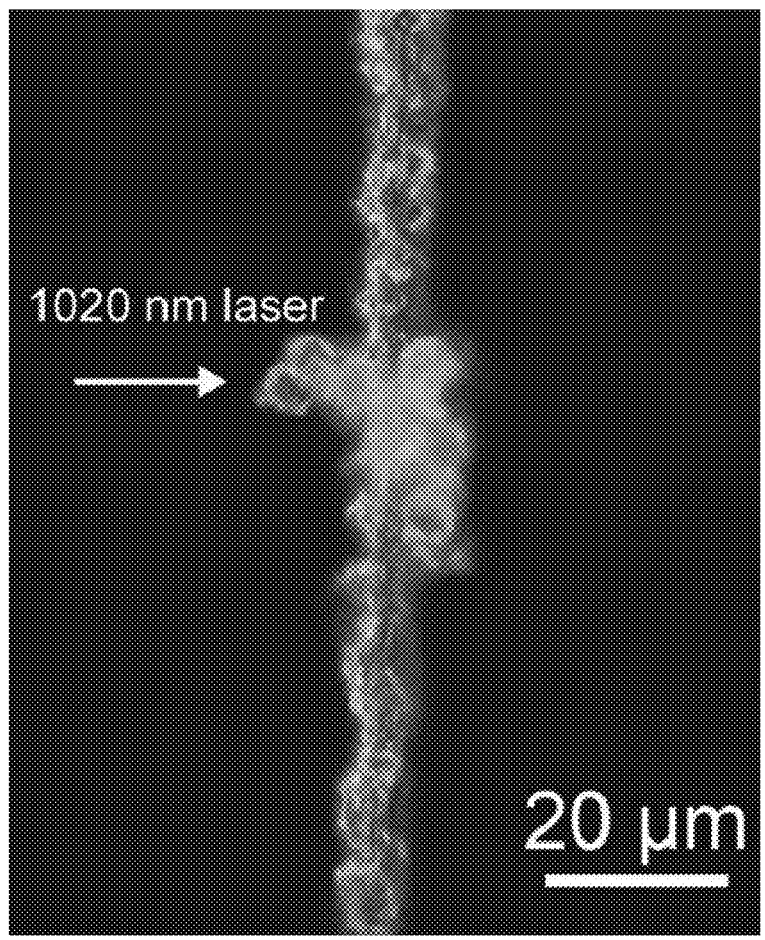
FIG. 1A is an optical microscope image of an example fiber in accordance with the present technology.

FIG. 1A is an optical microscope image of an example fiber in accordance with the present technology. In some embodiments, the fiber is an optical fiber. In some embodiments, the optical fiber is a portion of a core-pumped fiber-laser cavity. In some embodiments, the fiber is an etched fiber. In some embodiments, the fiber is formed from glass. In some embodiments, microcrystals are attached to an etched fiber. In some embodiments, the microcrystals are formed from the group of Yb:YLiF$_4$, Yb:NaYF$_4$, Yb:LuLiF$_4$, Yb:KLuF$_4$, and Yb:KYF$_4$. In some embodiments, such as the one shown in FIG. 1A, the optical fiber is a cladding-etched bare glass fiber with YLF crystals attached to it using a layer of commercially available fluoropolymer CYTOP with an ultra-low NIR absorption coefficient. The optical fiber in FIG. 1A is illuminated perpendicularly in the far field with a 1020 nm continuous-wave (CW) laser focused onto a crystal at a range of irradiances up to 1 MW/cm$^2$.

Figure 1B:
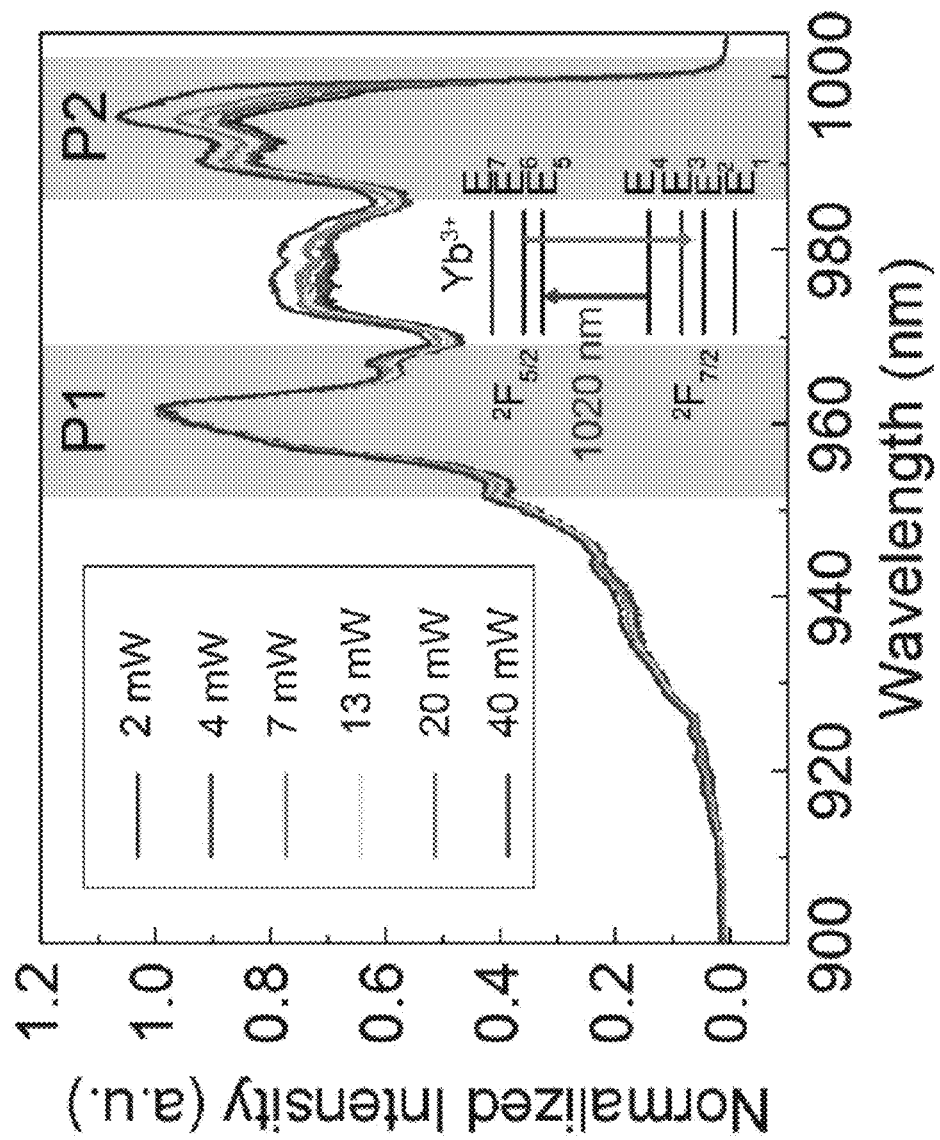
FIG. 1B is a graph of an example Yb:YLF photoluminescence spectra at various laser irradiances in accordance with the present technology.

FIG. 1B is a graph of an example Yb:YLF photoluminescence spectra at various laser irradiances in accordance with the present technology. On the horizontal axis is wavelength. On the vertical axis is the normalized intensity. P1 and P2 are electronic transitions $E_6$–$E_2$ and $E_5$–$E_2/E_3$, respectively. Yb:YLF photoluminescence spectra are shown at various laser irradiances, normalized to the P1 peak. At higher irradiance the P2 peak increases in intensity. The integration ranges for P1 and P2 are from 952 nm to 968 nm and 986 nm to 1000 nm, respectively. The intensity ratio of P1 and P2 bands in FIG. 1B is temperature dependent based on a Boltzmann distribution, and lower ratio values correspond to lower temperatures. PL spectra were normalized to the peak at 960 nm. These PL spectra arise from ytterbium's electronic transitions between $^2F_{5/2}$ and $^2F_{7/2}$ and the manifolds are illustrated. In some embodiments, a 1020 nm laser pumps a hole from energy level $E_5$ energy level $E_4$. The holes are then upconverted further by phonons within the $^2F_{7/2}$ manifold followed by anti-Stokes emission. The radiative relaxation following upconversion transports the heat extracted from the lattice to free space, resulting in cooling.

In one embodiment, a 1020 nm laser from a fiber coupled single mode laser diode (QPhotonics, QFBGLD-1020-400) was focused to a diffraction limited spot (radius=1.2 µm) using a long working distance 50× objective (Mitutoyo, M Plan Apo), and photoluminescence (PL) was collected by the same objective. The PL spectra were recorded with a spectrometer (Ocean Optics, NIR512). A 1000 nm short-pass filter (Thorlabs, FESH1000) was used to filter the laser line. Ten spectra, collected for 100 ms each, were averaged to obtain the final PL spectrum. The temperature-calibrated PL spectra were obtained using a cryostat (Janis, ST500) in which the sample temperature was maintained at various points from 300 K to 350 K by a temperature controller (Lake Shore, 335) with resolution 0.01 K.

Figure 1C:
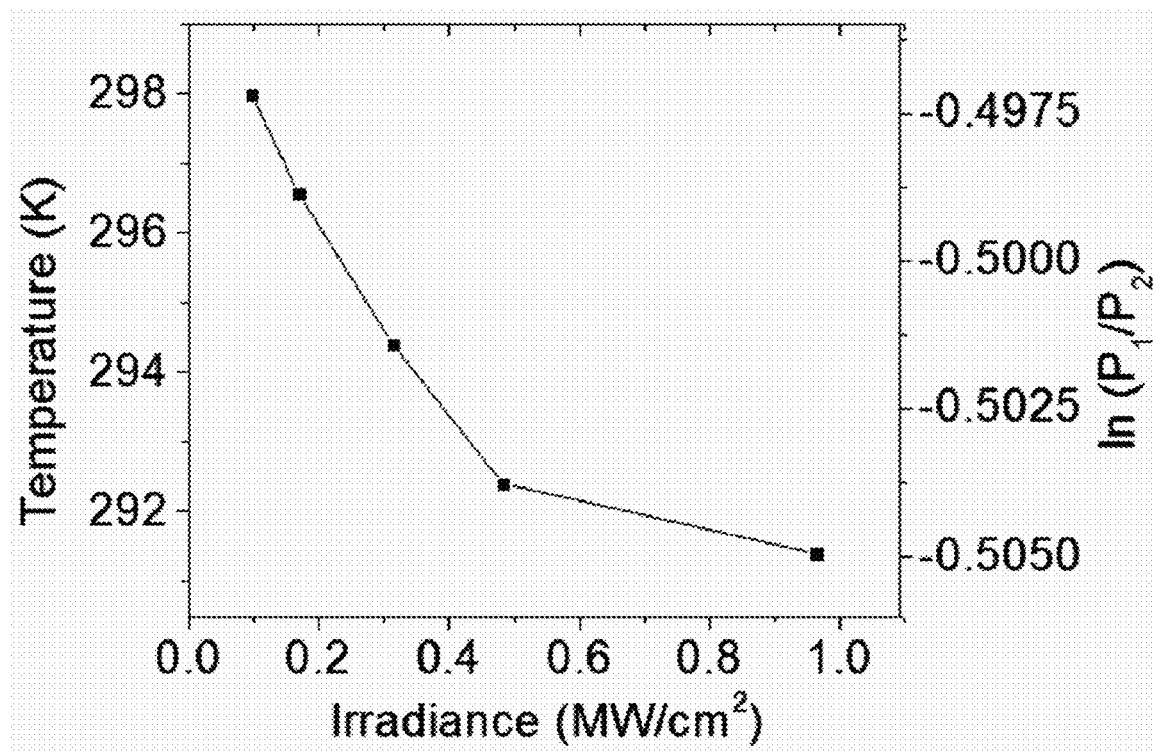
FIG. 1C is a graph of an example integrated intensity ratio of P1 and P2 peaks with the corresponding calibrated temperature at each laser irradiance in accordance with the present technology.

FIG. 1C is a graph of an example integrated intensity ratio of P1 and P2 peaks with the corresponding calibrated temperature at each laser irradiance in accordance with the present technology. On the horizontal axis is irradiance. On the vertical axis is temperature. The integrated intensity ratio of P1 and P2 peaks are illustrated with the corresponding calibrated temperature at each laser irradiance. After calibrating the intensity ratio to the temperature, the Yb:YLF crystal decreases in temperature by 6.6 K. At each laser irradiance, a mean P1/P2 ratio was obtained by averaging six measurements and the error bars represent one standard deviation, which are smaller than 1% of the mean values. The hydrothermally synthesized laser cooling Yb:YLF nanocrystals can be mixed within the cladding material at various volumetric fractions. When the nanocrystals are embedded in the cladding near the core-shell interface, the evanescent field may optically pump the cooling materials and lower the local temperature through anti-Stokes photoluminescence. Rayleigh scattering can be reduced by index matching the composite host material with the index of YLF ($n_{YLF}$~1.47).

Figure 2A:
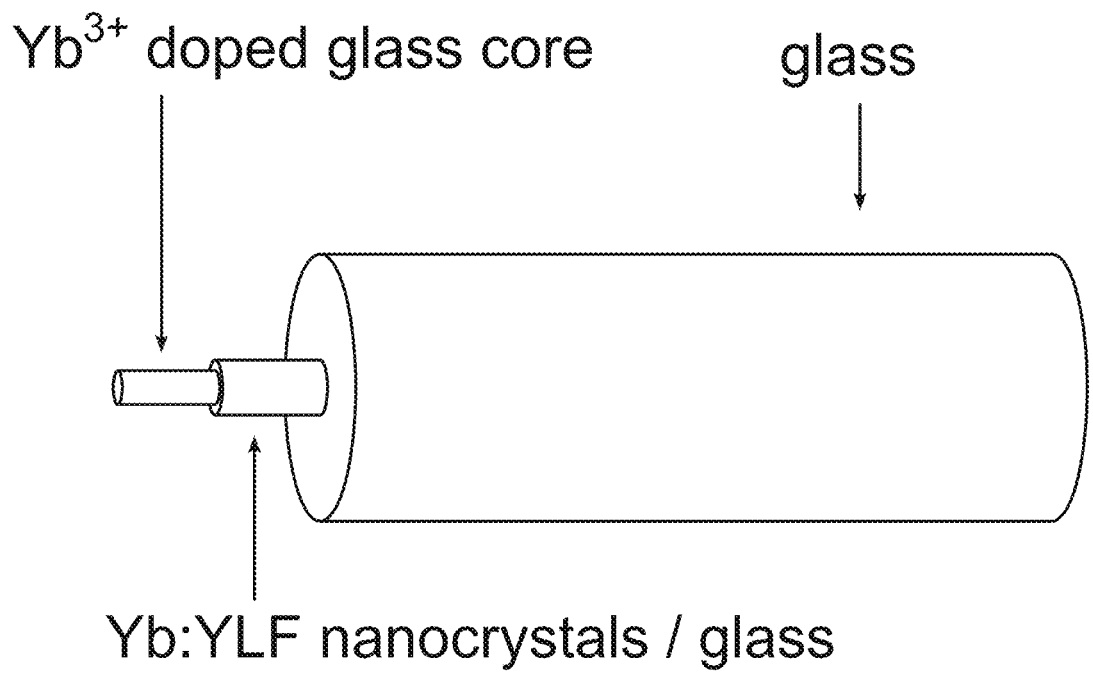
FIG. 2A is a schematic of an example fiber in accordance with the present technology.

FIG. 2A is a schematic of an example fiber in accordance with the present technology. In some embodiments, the optical fiber includes a core, an inner cladding, and an outer cladding. In some embodiments, the optical fiber is a portion of a core-pumped fiber-laser cavity. In some embodiments, the optical fiber is a single-mode fiber. In some embodiments, the optical fiber is a single-mode fiber with a step-index profile, which has the highest output laser quality. In some embodiments, a fiber laser is pumped through an inner core. In some embodiments, a first cladding can serve as the pump. In some embodiments, the optical fiber is a multi-mode fiber.

For simplicity, the illustrated fiber includes a core of Yb-doped glass. In other embodiments, the core may be formed from the group of Yb:YLiF$_4$, Yb:NaYF$_4$, Yb:LuLiF$_4$, Yb:KLuF$_4$, and Yb:KYF$_4$. In some embodiments, the core may be comprised of another material. The illustrated fiber also includes the inner region of the cladding composed of glass and YLF nanocrystals, and the outer region of the cladding, made of the same glass as the inner cladding region, but with no Yb:YLF. In some embodiments, the cladding comprises a host material and an optically activated cooling material. In some embodiments, the cladding is formed from a glass or a polymer. In some embodiments, the cladding may be comprised of other Yb materials such as those described previously.

In operation, the core is configured to substantially confine electromagnetic radiation from a laser. In some embodiments, the electromagnetic radiation has a peak wavelength in the infrared range. In some embodiments, the wherein the electromagnetic radiation has a peak wavelength in a range of about 1020 nm to about 1064 nm. In some embodiments, the cladding is in thermal communication with the core.

In operation, the optical fiber is configured to provide optically activated cooling of the core via the electromagnetic radiation from the laser. In some embodiments, the optically activated cooling results from an optically activated cooling material in the cladding. In some embodiments, the cooling material is selected from the group of Yb:YLiF$_4$, Yb:NaYF$_4$, Yb:LuLiF$_4$, Yb:KLuF$_4$, and Yb:KYF$_4$. In some embodiments, high-quality 10% Yb:YLF laser-cooling materials are produced through hydrothermal synthesis.

In one embodiment, the hydrothermal method used to synthesize single crystals of 10% Yb:YLF. Yttrium chloride hexahydrate (YCl$_3$·6H$_2$O) and ytterbium chloride hexahydrate (YbCl$_3$·6H$_2$O) were of 99.999% and 99.998% purity, respectively. Lithium fluoride (LiF), lithium hydroxide monohydrate (LiOH·H$_2$O), ammonium bifluoride (NH$_4$HF$_2$), and ethylenediaminetetraacetic acid (EDTA) were analytical grade and used directly in the synthesis without any purification. All chemicals were purchased from Sigma-Aldrich. For the synthesis of Yb:YLF, 0.585 g (2 mmol) of EDTA and 0.168 g (4 mmol) LiOH·H$_2$O were dissolved in 10 mL Millipore DI water and heated to approximately 80° C. while stirring. After the EDTA was dissolved, 1.8 mL of 1.0 M YCl$_3$ and 0.2 mL of 1.0 M YbCl$_3$ were added and continuously stirred for 1 hour. This mixture is denoted as solution A. Subsequently, 0.105 g (4 mmol) of LiF and 0.34 g (8 mmol) of NH$_4$HF$_2$ were separately dissolved in 5 mL Millipore DI water and heated to approximately 70° C. while stirring for 1 hour. This solution is denoted as solution B. After stirring, solution B was added dropwise into solution A while stirring to form a homogeneous white suspension. After 30 minutes, the mixture was transferred to a 23 mL Teflon-lined autoclave (Parr 4747 Nickel Autoclave Teflon liner assembly) and heated to 180° C. for 72 hours in an oven (Thermo Scientific Heratherm General Protocol Oven, 65 L). After the autoclave cooled to room temperature the Yb:YLF particles were sonicated and centrifuged at 4000 rpm with ethanol and Millipore DI water for three times respectively. The final white powder was then dried at 60° C. for 12 hours followed by calcination at 300° C. for 2 hours inside a quartz tube in a furnace (Lindberg blue).

Figure 2B:
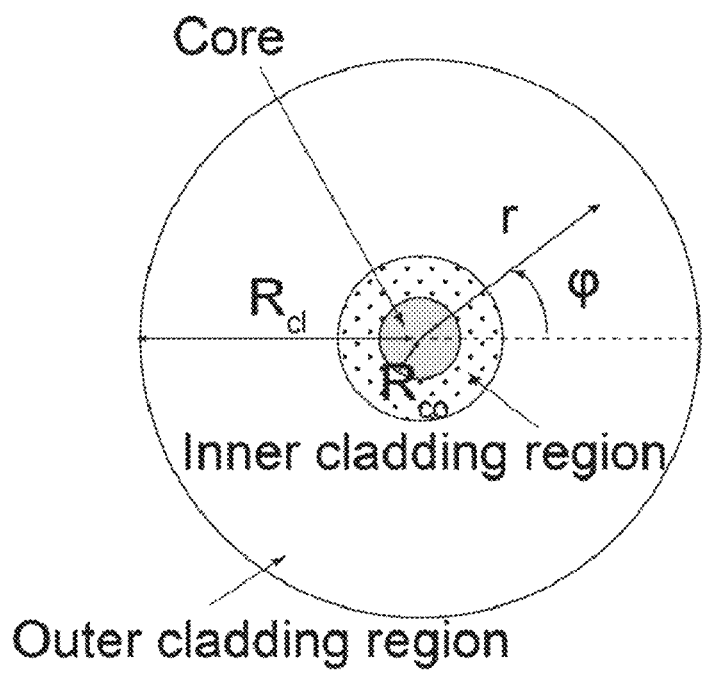
FIG. 2B is a cross-section of an example fiber in accordance with the present technology.

FIG. 2B is a cross-section of an example fiber in accordance with the present technology. In some embodiments, as illustrated in FIG. 2B, the core material is Yb-doped glass with a small diameter. In one embodiment, the core diameter is 1.38 µm. In some embodiments, the Yb-doped glass amplifies the laser signal and generates heat inside the core. In some embodiments, the cladding consists of a thin inner region doped with YLF nanocrystals, and an outer region free of nanocrystals. In some embodiments, the cladding has a lower optical refractive index than the core. In FIG. 2B, R$_{co}$ and R$_{cl}$ are the core radius and total cladding radius, which are 0.69 µm and 62.5 µm, respectively. Additional fiber parameters are listed in Table 1.

TABLE 1

Fiber parameters

| Parameters | Values |
| --- | --- |
| Core radius R$_{co}$ | 0.69 µm |
| Composite cladding radius | 5 µm |
| Total cladding radius R$_{cl}$ | 62.5 µm |
| Fiber length L | 1 m |
| Wavelength λ | 1020 nm |
| Core refractive index N$_{co}$ | 1.52 + 3.88E−8i |
| Cladding glass refractive index N$_{matrix}$ | 1.4705 + 1.003E−8i |
| Yb:YLF refractive index N$_{YLF}$ | 1.4705 + 5.346E−6i |
| Glass thermal conductivity κ | 1.5 W/(m · K) |
| Air thermal conductivity κ$_s$ | 0.02624 W/(m · K) |
| Pumping irradiance | 100 kW/(m$^2$) |
| Room temperature T$_\infty$ | 298 K |

In operation, the optical fiber cladding is cooled by impinging electromagnetic radiation from a laser on an optical fiber. In some embodiments, the cladding is cooled greater than 15K. In some embodiments, the optically activated cooling results from emission of upconverted, anti-Stokes photoluminescence in the cladding.

The optical fiber in FIG. 2B is illustrated as cylindrical, but in other embodiments, the optical fiber may take other shapes. In one embodiment, the cylindrical optical fiber the temperature is described in three dimensions by the energy equation:

$$\rho \hat{c} \frac{\partial T}{\partial t} = \kappa \left( \frac{1}{r} \frac{\partial}{\partial t}\left( r \frac{\partial T}{\partial r} \right) + \frac{1}{r^2} \frac{\partial^2 T}{\partial \phi^2} + \frac{\partial^2 T}{\partial z^2} \right) + Q''', \quad (1)$$

in which ρ is the mass density of the fiber [kg/m$^3$], ĉ is the heat capacity [J/(kg·K)], K is the thermal conductivity [W/(m·K)], T is the temperature [K], Q''' is the rate of heat generation (or depletion) per unit volume due to electromagnetic (EM) heating or cooling [J/(m$^3$·s)]. In some embodiments, the thermal properties of the core and cladding are the same because they are similar glass materials. In some embodiments, the thermal properties of the core and cladding are different. In some embodiments, the heat source is found to be nearly independent of the angular coordinate, (p. Consequently, the angular conduction term in Eq. 1 can be neglected.

The energy equation is written in a dimensionless form:

$$\frac{\partial \Theta}{\partial \tau} = \frac{1}{\xi} \frac{\partial}{\partial \xi}\left( \xi \frac{\partial \Theta}{\partial \xi} \right) + \left( \frac{R_\infty}{L} \right)^2 \frac{\partial^2 \Theta}{\partial \zeta^2} + S(\zeta, \phi, \zeta), \quad (2)$$

by introducing the dimensionless vaniables.

$$\Theta = \frac{T - T_\infty}{T_\infty}, \xi = \frac{r}{R_\infty}, \zeta = \frac{z}{L}, \tau = \frac{\kappa}{\rho \zeta} \frac{t}{R_\infty^2}, S = \frac{R_\infty^2 Q'''}{\kappa T_\infty}. \quad (3)$$

Here $\Theta$ is the dimensionless temperature and $T\infty$ is the temperature of the surrounding medium, which is also the initial temperature of the example fiber.

The solution is in a product form $$\Theta(\xi, \zeta, \tau) = \sum_m \sum_n A_{mn}(\tau) X_m(\xi) Z_n(\zeta), \quad (4)$$

where $$X_m(\xi) = J_0(\gamma_m \xi), \ m = 1, 2, 3, \ldots \quad (5)$$

$$Z_n(\zeta) = \cos(n\pi\zeta), \ p = 0, 1, 2, 3, \ldots \quad (6)$$

$J_0$ in Eq. 5 is the zero-order Bessel function. The eigenvalues $\gamma_m$ satisfy the boundary condition $$\frac{dX_m(\xi)}{d\xi}\bigg|_{\xi_s} = -Bi \cdot X_m(\xi_s). \quad (7)$$

in which $\xi_s = R_{cl}/R_{co}$, and the Biot number is defined by $$Bi = \frac{Nu \cdot \kappa_s \cdot R_{co}}{2\kappa R_{cl}} \quad (8)$$

The Nusselt number (Nu) is given by $$Nu = \frac{2R_{cl} h}{\kappa_s}, \quad (9)$$

where h is the heat transfer coefficient for transport between the fiber and the surroundings, and $\kappa_s$ is the thermal conductivity of the surroundings. For heat transfer from a cylinder to a stagnant medium Nu=0.32. The time-dependent coefficients $A_{mn}(\tau)$ in Eq. 4 are given by $$A_{mn}(\tau) = \frac{1 - e^{(-\lambda_{mn}^2 \tau)}}{\lambda_{nm}^2} \int_0^{\xi_\zeta} \int_0^1 \frac{S(\xi', \phi, \zeta')\zeta' X_m(\zeta') Z_n(\zeta') d\xi' d\zeta'}{\|X_m\|^2 \|Z_n\|^2}, \quad (10)$$

in which $$\lambda_{mn}^2 = \gamma_m^2 + \left(\frac{R_\omega}{L}\right)^2 (n\pi)^2, \quad (11)$$

and the norms are $$\|X_m\|^2 \int_0^{\xi_\zeta} \xi' |J_0(\gamma_m \xi')|^2 d\xi', \quad (12)$$

$$\|Z_n\|^2 = \int_0^1 \cos^2(n\pi\zeta') d\zeta'. \quad (13)$$

The steady state solution is obtained by taking the limit as $\tau \to \infty$ to give $$A_{mn} = \frac{\int_0^{\xi_\zeta} \int_0^1 S(\zeta', \phi, \zeta')\zeta' X_m(\zeta') Z_n(\zeta') d\zeta' d\zeta'}{\lambda_{mn}^2 \|X_m\|^2 \|Z_n\|^2}, \quad (14)$$

Figure 3A:
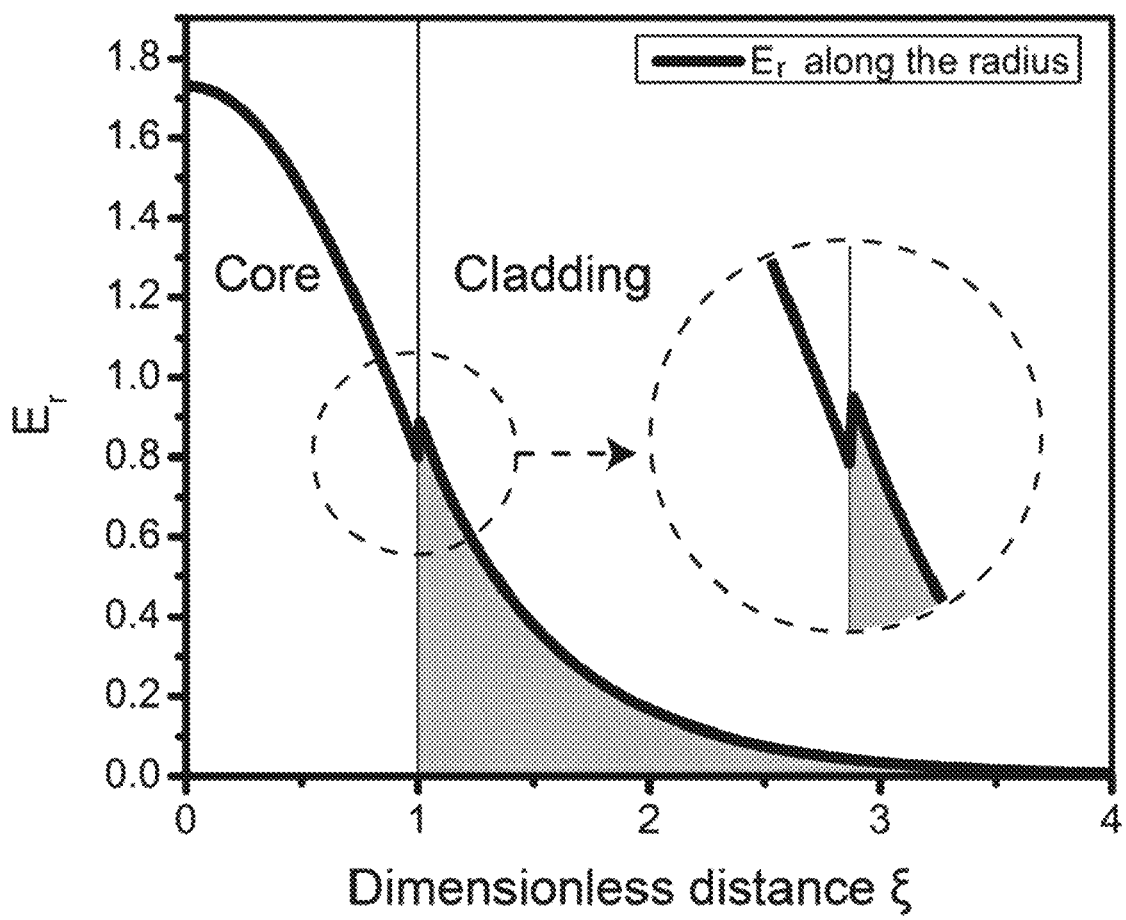
FIG. 3A is a graph of the radial electric field in the core and cladding of an example fiber in accordance with the present technology.
Figure 3B:
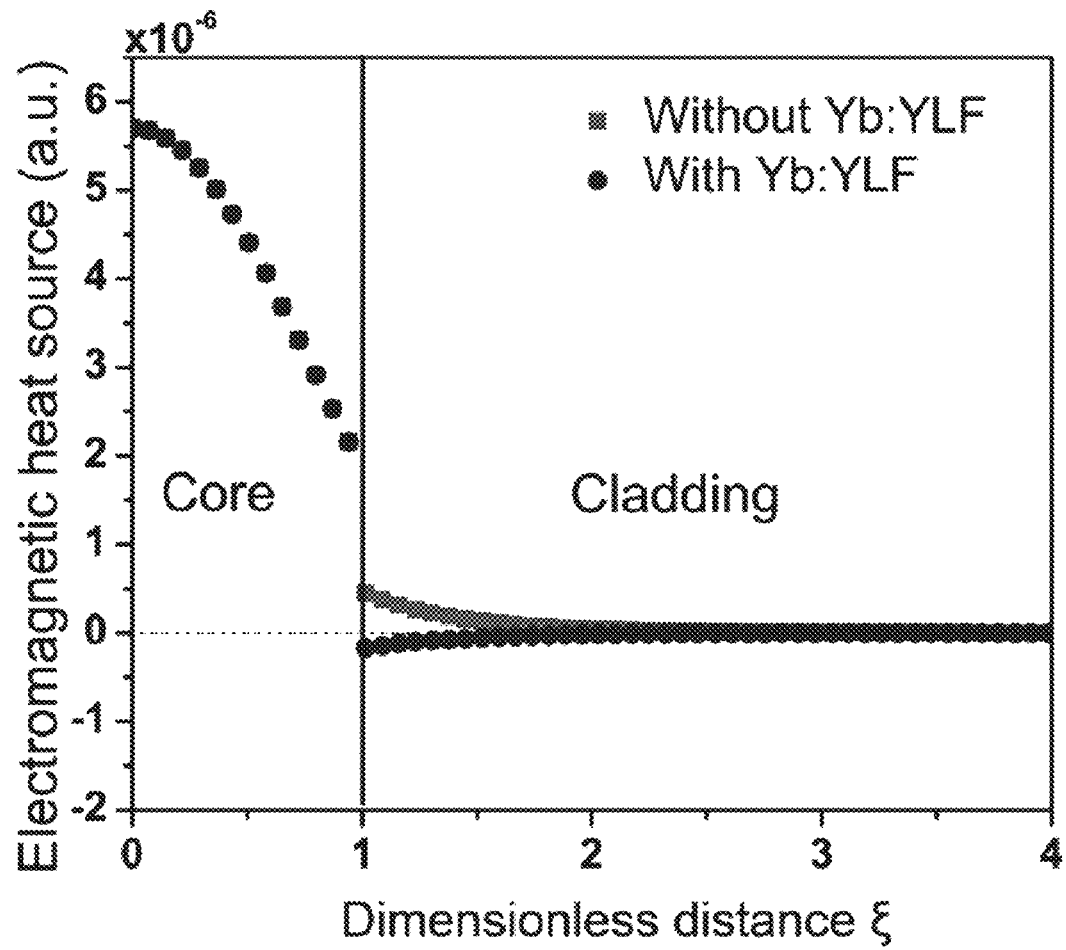
FIG. 3B is a graph of the radial distribution of the EM heat source within example fibers in accordance with the present technology.

FIG. 3A-3B show the EM-field within a single-mode guided step index fiber. The volumetric rate of heat generated inside the fiber is related to the EM-field associated with the laser irradiation, which is given by the equation:

$$Q'''(r, \phi, z) = \frac{1}{2} \sigma_i (E \cdot E^*), \quad (15)$$

where E and E* are the internal electric-field vector and its complex conjugate, respectively, and $\sigma_i$ is the effective conductivity of the fiber core or cladding material. In some embodiments, during lasing there are two wavelengths propagating through the fiber—the pump wavelength and the lasing wavelength. For simplicity, these two wavelengths are not distinguished from one another. In one embodiment, only one high-power fundamental mode was considered as the EM heat source. Since Yb:YLF can be refrigerated optically in a wide excitation wavelength range (1005 nm-1065 nm, at room temperature), in some embodiments, both pump and lasing wavelengths lie in this range and excite the cooling of Yb:YLF within the cladding. Because of this, in some embodiments, it is not necessary to calculate the heat sources for the pump and lasing wavelengths separately. In some embodiments, the propagating light wavelength is 1020 nm, under which excitation Yb:YLF has been predicted to reach its lowest temperature. In some embodiments, the anti-Stokes emission from YLF within the cladding is not reabsorbed and that Rayleigh scattering is negligible. Snyder and Love have tabulated the components of the electric vectors for optical fiber waveguides having a step-index profile which we use below.

FIG. 3A is a graph of the radial electric field in the core and cladding of an example fiber in accordance with the present technology. The radial electric field in the core and cladding is illustrated for $\varphi=90°$. On the horizontal axis is the dimensionless distance. On the vertical axis is $E_r$. $E_r$ along the radius is plotted as a black line. The graph shows the radial component of the electric field at z=0, $\varphi=90°$ for a vertically polarized (along v=90°) laser propagating in the z direction. The highlighted discontinuity at the core-cladding interface is due to the boundary condition:

The optical field extending into the cladding excites the YLF leading to local laser refrigeration. This evanescent field penetrates only a short distance into the cladding layer, so in some embodiments. the Yb:YLF nanocrystals only need to be incorporated in that narrow region. In other embodiments, the Yb:YLF nanocrystals, or other such cooling material may be incorporated in a broader region. In some embodiments, the thickness of this inner region of the cladding, which contains the cooling materials, is slightly greater than the evanescent penetration thickness. This inner cladding layer is composed YLF nanocrystals uniformly dispersed within a glass matrix. This glass matrix is not Yb-doped as the core glass, but it still absorbs slightly and generates heat. In some embodiments, the outer cladding without the nanocrystals serves only as a mechanical supporting layer to protect the core. Since there is no electric field in this region, only the heat generated inside the core and the inner cladding region are considered.

FIG. 3B is a graph of the radial distribution of the EM heat source within example fibers in accordance with the present technology. On the horizontal axis is the dimensionless distance. On the vertical axis is the electromagnetic heat source. The radial distribution of the EM heat source within the fiber without Yb:YLF cladding (squares) and a fiber with 10% volume fraction of Yb:YLF mixed into the cladding (circles) is plotted. When there is no Yb:YLF cooling nanocrystals in the cladding, both the core and cladding layers act as heating sources. When Yb:YLF nanocrystals are incorporated in the cladding with a volume fraction of 10%, and the cooling efficiency of Yb:YLF is 2% (v=10%, $\eta_{cooling}$=2%), the cladding layer acts as a cooling source. The heating in the cladding may be eliminated with a YLF volume fraction of 8%.

In one embodiment, the effective electrical conductivity of the fiber core or cladding materials is given by $$\sigma_i = \frac{4\pi \text{Re}\{N_i\}\text{Im}\{N_i\}}{\lambda \mu c}, \qquad (17)$$

in which $N_i = n_i + ik_i$ is the complex refractive index of the fiber core or cladding. $n_i = \text{Re}\{N_i\}$ is the real part and $k_i = \text{Im}\{N_i\}$ is the imaginary part of the refractive index. $\lambda$ is the wavelength in free space, p is the magnetic permeability, and c is the velocity of light in vacuum. The heat source in the core is $$\dot{Q}_{\infty}^m(r, \phi, z) = \frac{1}{2}\sigma_{\infty}(E \cdot E^*) = \frac{2\pi n_{co} k_{co}}{\lambda \mu c}(E \cdot E^*). \qquad (18)$$

In some embodiments, the EM source in the cladding is composed of the heating associated from the matrix material and the cooling due to the Yb:YLF nanocrystals. The thermal source in the cladding is given by $$\dot{Q}_{cl}^m(r, \phi, z) = \qquad (19)$$
$$(1-v)\frac{1}{2}\sigma_{cl}^{matrix}\frac{2\pi n_{co}k_{co}}{\lambda \mu c}(E \cdot E^*) + (-)v\eta_{cooling}\frac{1}{2}\sigma_{cl}^{YLF}\frac{2\pi n_{co}k_{co}}{\lambda \mu c}(E \cdot E^*)$$

where v is the volume fraction of Yb:YLF nanocrystals in the composite matrix, $\sigma_{cl}^{matrix}$ and $\sigma_{cl}^{YLF}$ are the effective conductivities for the matrix glass material and Yb:YLF nanocrystals in the cladding respectively, and $\eta_{cooling}$ is the cooling efficiency of the Yb:YLF. $n_{YLF}$, $k_{YLF}$ and $n_{matrix}$, $k_{matrix}$ are the real and imaginary terms of the refractive indices for Yb:YLF and the cladding glass materials. The competition of the heating and cooling processes in the cladding depends on the volume fraction of YLF in the cladding, the refractive indices of YLF and matrix materials, and also the overall cooling efficiency.

FIG. 4A-4E show the effects of an example cladding refractive index on the EM-field. The refractive index is the most important material property for an optical fiber in that every waveguide parameter depends on it. In some embodiments, refractive indices of core and the fiber geometry are the same. For the core material, larger k results in higher absorption and increased heat generation. However, the effect of the cladding refractive index is less apparent. Varying both the real and imaginary components of the refractive index of the cladding impacts laser cooling. The core parameters were assumed to remain constant while changing the real or imaginary components of the cladding. For a single mode fiber, the single mode condition: $v=(2\pi/\lambda)a(n_{co}^2-n_{cl}^2)<2405$ is satisfied. Therefore, $\Delta n = n_{co} - n_{cl}$ should be smaller than 0.12. The electric field, which is the solution of the Maxwell equations for the waveguide boundary condition, is given by $$E(r,\phi,z) = e(r,\phi)e^{i\beta z}, \qquad (20)$$

in which $\beta$ is the propagation constant. This suggests that a smaller $\Delta n$ is helpful for cooling because more energy flux is produced in the cladding layer to excite the composite cooling region adjacent to the core. However, there is a trade-off in that more pump power is required to achieve an equivalent output power from the core. Additionally, the coupling efficiency of the pump also needs to be considered.

Figure 4A:
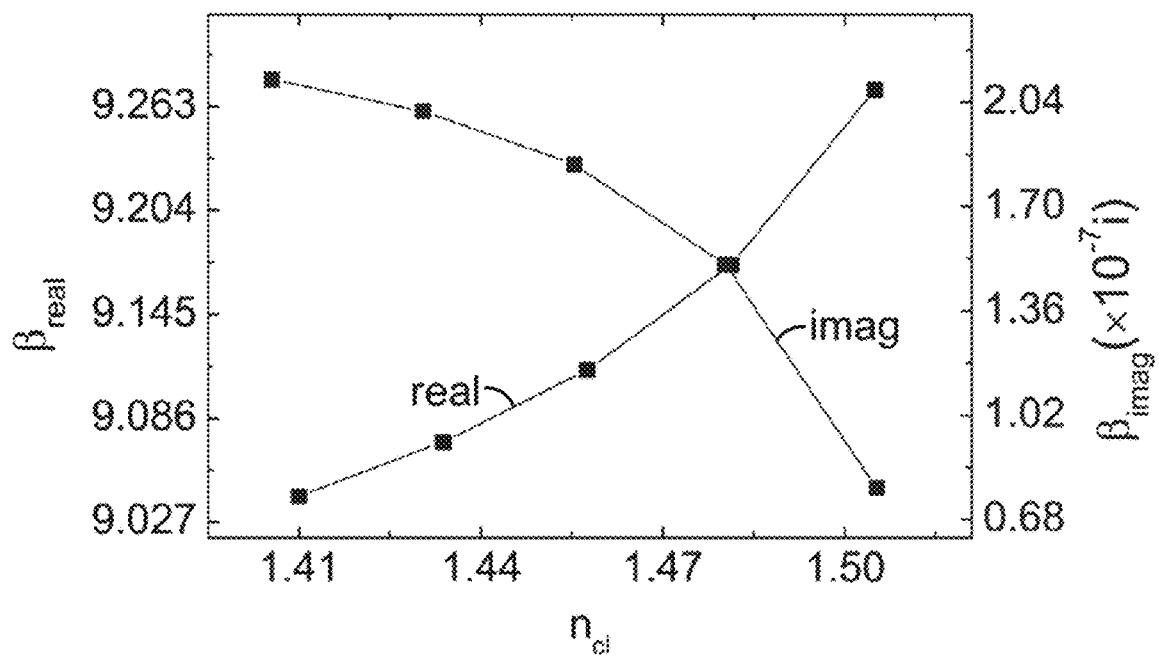
FIG. 4A is a graph of the propagation constant of an example fiber with various values of $n_{cl}$ in accordance with the present technology.

FIG. 4A is a graph of the propagation constant of an example fiber with various values of $n_{cl}$ in accordance with the present technology. One the horizontal axis is $n_{cl}$. On the vertical axis on the left side is the $\beta_{real}$. On the vertical axis on the right side is the $\beta_{imaj}$. The propagation constants for fibers with various values of $n_{cl}$ is plotted. The real part of the propagation constant describes the rate of phase change with z, while the imaginary part constitutes the decay rate of the electric field.

Figure 4B:
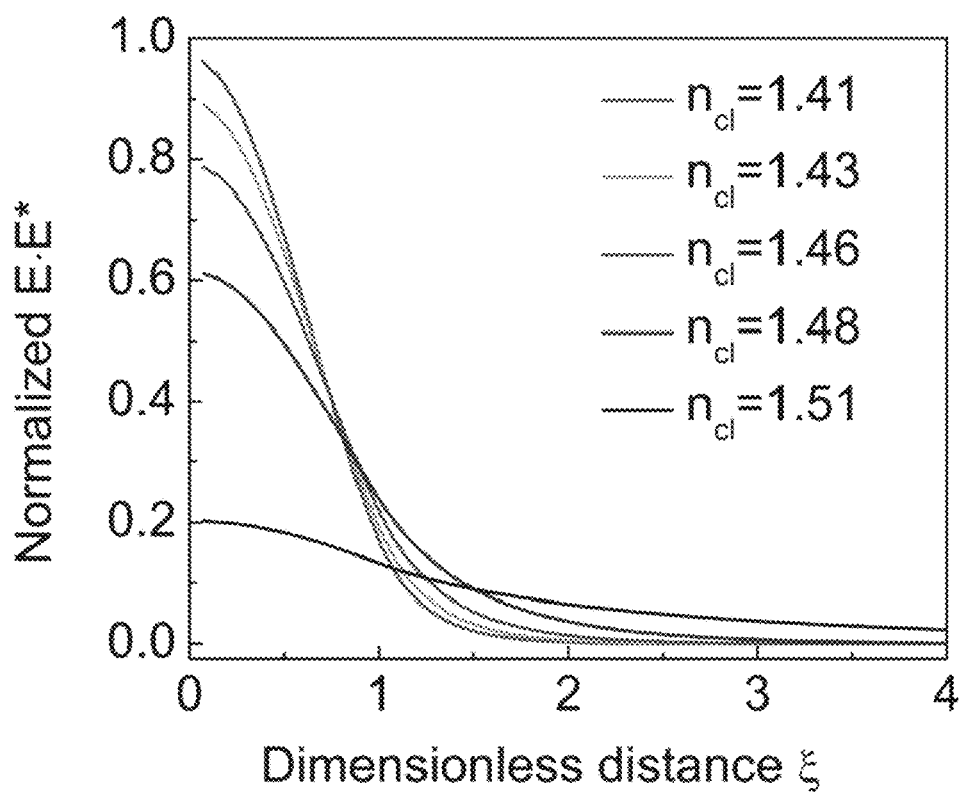
FIG. 4B is a graph of the radial distribution of annular normalized E·E* of an example fiber in accordance with the present technology.

For small $n_{cl}$, or a larger $\Delta n$, $\beta_{real}$ is smaller and the electric field is more confined within the core (as shown in FIG. 4B). $\beta_{imaj}$ decreases with increasing $n_{cl}$, which implies a lower decay rate along the z-axis (as shown in FIG. 4C).

FIG. 4B is a graph of the radial distribution of annular normalized E·E* of an example fiber in accordance with the present technology. On the horizontal axis is the dimensionless distance. On the vertical axis is the normalized E·E*. Various values of $n_{cl}$ are shown and distinguished by color. As the $n_{cl}$ value increases, the normalized E·E* decreases as the dimensional distance increases. This implies that the electric field is more confined within the core.

Figure 4C:
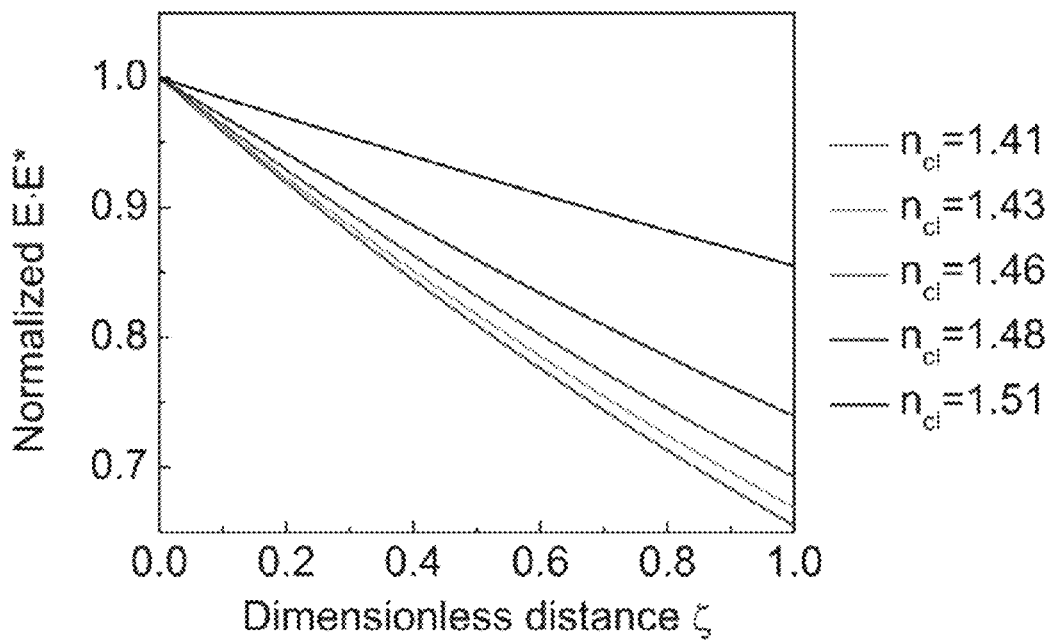
FIG. 4C is a graph of the longitudinal distribution of E·E* of an example fiber in accordance with the present technology.

FIG. 4C is a graph of the longitudinal distribution of E·E* of an example fiber in accordance with the present technology. On the horizontal axis is dimensionless distance. On the vertical axis is the normalized E·E*. Color legends are the same as FIG. 4B. To compare the longitudinal decay rate, the maxima of the energy flux are normalized to 1. As the $n_{cl}$ value increases, the normalized E·E reduces at a slower rate as the dimensionless distance increases.

Figure 4D:
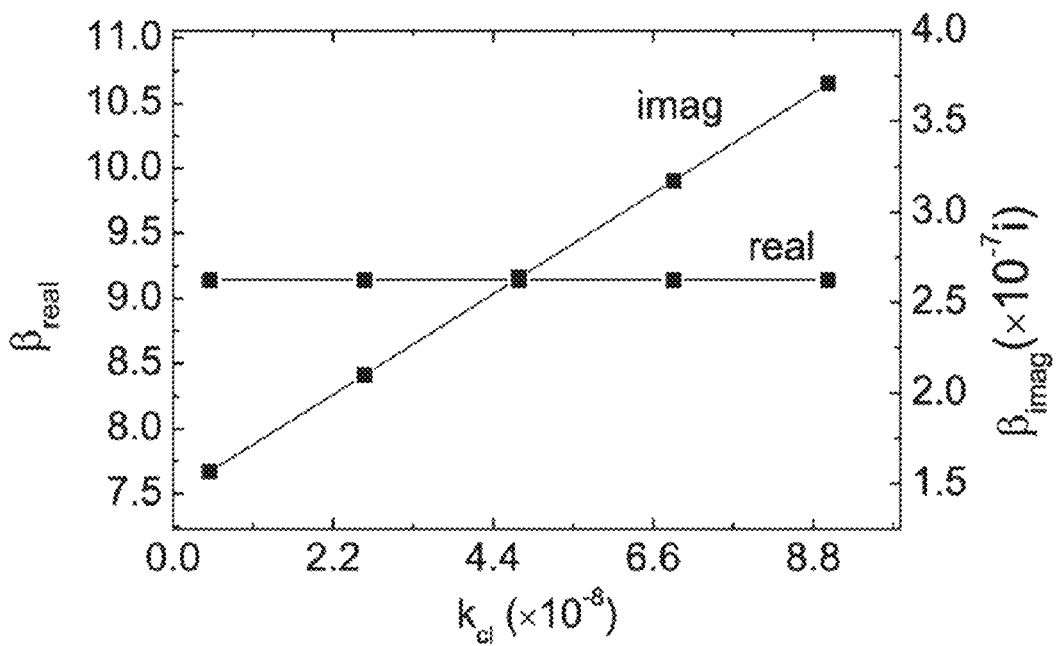
FIG. 4D is the propagation constant of an example fiber with various values of kc in accordance with the present technology.

FIG. 4D is the propagation constant of an example fiber with various values of $k_{cl}$ in accordance with the present technology. On the horizontal axis is $k_{cl}$. On the vertical axis is $\beta_{real}$. When tuning the imaginary part of the cladding refractive index, $\beta_{real}$ does not change with $k_{cl}$ while the imaginary part of the propagation constant, $\beta_{imag}$, increases with larger $k_{cl}$. With the same $\beta_{real}$, the radial electric field distributions are identical when $k_{cl}$ is varied. To reduce the energy decay along z, a smaller kc for the cladding layer is optimal.

Figure 4E:
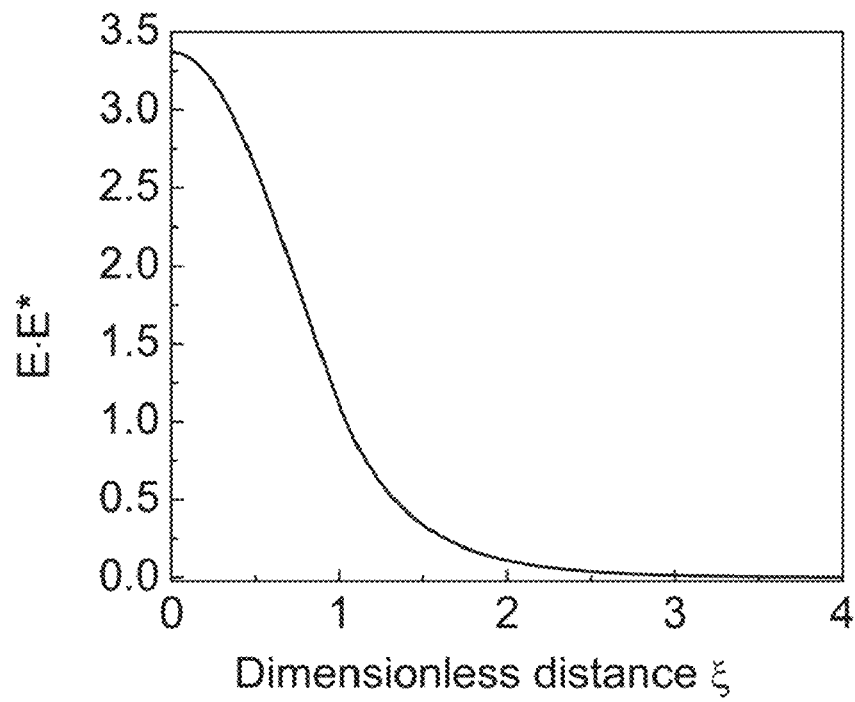
FIG. 4E is the radial distribution of E·E* of an example fiber in accordance with the present technology.

FIG. 4E is the radial distribution of E·E* of an example fiber in accordance with the present technology. On the horizontal axis is dimensionless distance. On the vertical axis is E·E. The propagation constant of the fiber is plotted with various values of $k_{cl}$. As the dimensionless distance increases, the E·E* of the fiber decreases steeply.

Figure 4F:
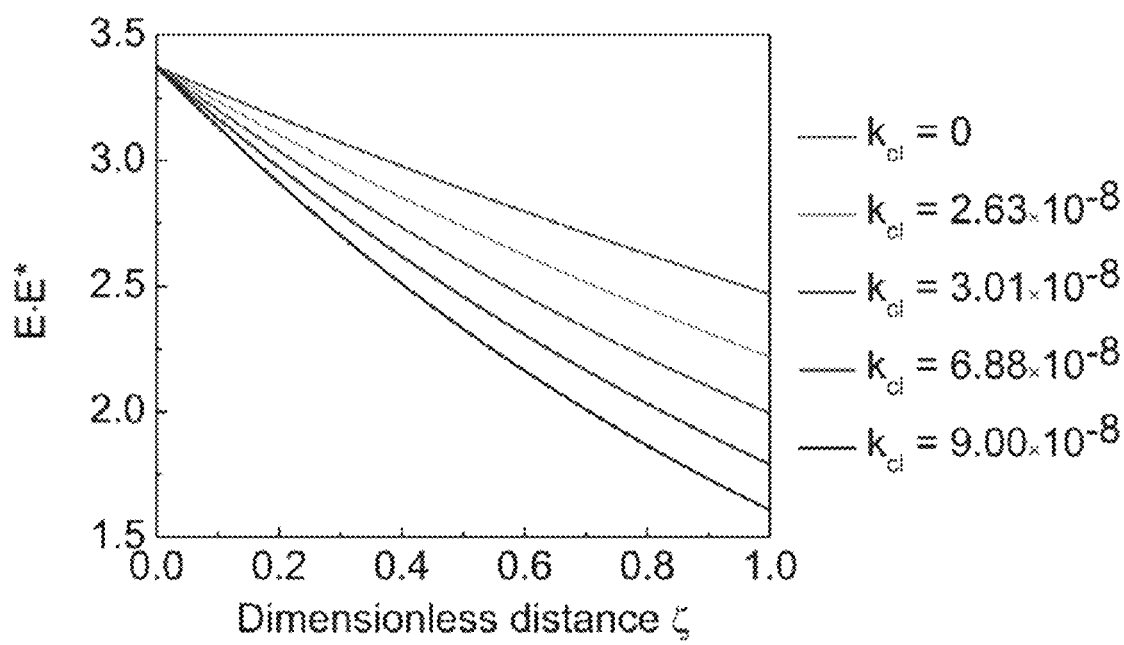
FIG. 4F is the longitudinal distribution of E·E* of an example fiber in accordance with the present technology.

FIG. 4F is the longitudinal distribution of E·E* of an example fiber in accordance with the present technology. Color legends are the same as FIG. 4E. FIG. 4E and FIG. 4F are not normalized because E·E* does not change with the fraction of Yb:YLF within the cladding leads to a decrease in the steady state temperature of the fiber. Temperature reductions of 12 K for a 5% Yb:YLF incorporated fiber and 19 K for a 10% Yb:YLF incorporated fiber (as shown in FIG. 5B) may occur. In some embodiments, a volume fraction of up to 20% YLF, would reduce temperatures even further.

Figure 5A:
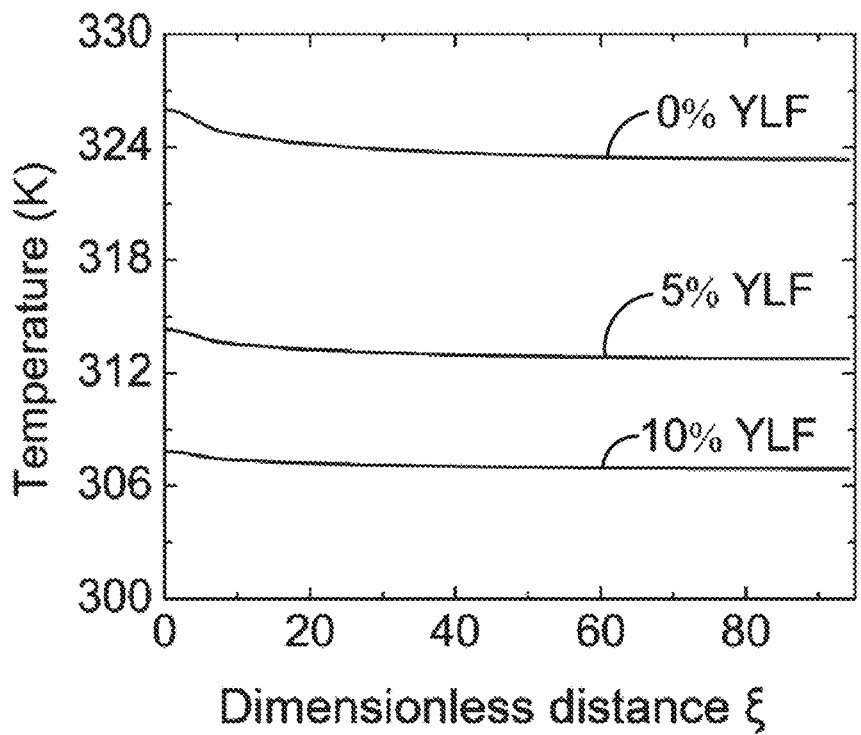
FIG. 5A is a graph of an example radial temperature distribution of example fibers in accordance with the present technology.
Figure 5B:
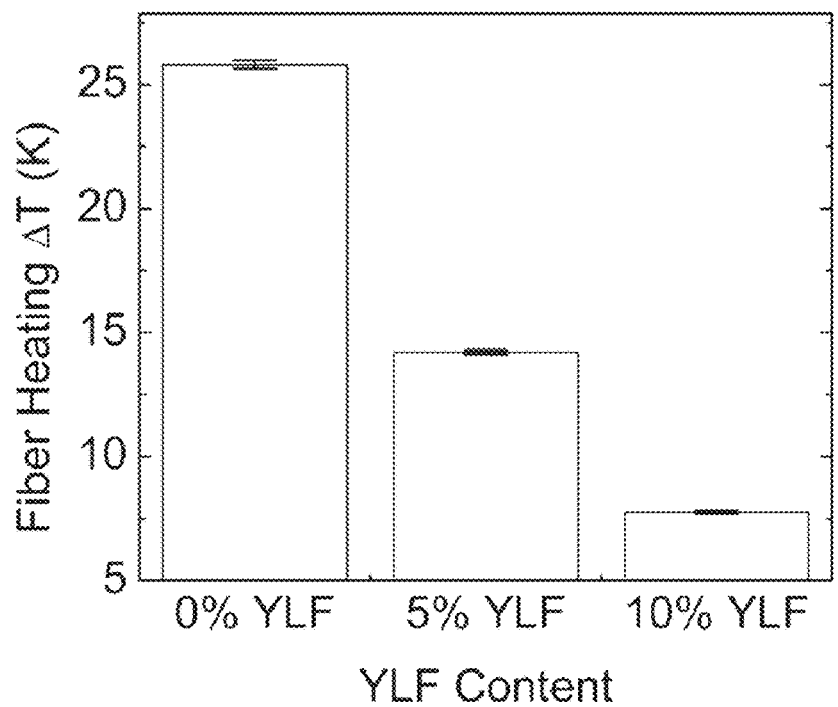
FIG. 5B is a graph of an example average temperature for the whole volume of an example fiber for various amounts of Yb:YLF in accordance with the present technology.

FIGS. 5A-5B show the temperature of the fibers with 0%, 5% and 10% Yb:YLF nanocrystals in the inner cladding layer. On the horizontal axis is dimensionless distance. On the vertical axis is temperature. In one embodiment, to evaluate the cooling performance of the nanocrystals in the fiber, the temperature distributions were calculated using the analytical solution presented above implemented using the Python programming language. The YLF volume fractions ranged from 0% to 10%. The other parameters used in the calculations are listed in Table 1. In some embodiments, to minimize the scattering in the inner layer of the cladding, the cladding glass is selected to match the real part of the refractive index of the Yb:YLF nanocrystals. This can be achieved by adjusting the concentration of dopants within the glass. In some embodiments the refractive indices of the Yb:YLF glass do not match. In some embodiments, effective medium theory for composite materials is used to calculate the effective refractive indices when the refractive indices do not match.

FIG. 5A is a graph of an example radial temperature distribution of example fibers in accordance with the present technology. On the horizontal axis is the dimensionless distance. On the vertical axis is temperature. The radial temperature distribution of an example fiber containing no Yb:YLF, 5% Yb:YLF, and 10% Yb:YLF in the inner cladding is plotted. The plot shows the fiber temperature distribution from the center to the outer surface of the cladding. As the concentration of Yb:YLF in the inner cladding is increased, the radial temperature distribution decreased.

FIG. 5B is a graph of an example average temperature for the whole volume of an example fiber for various amounts of Yb:YLF in accordance with the present technology. On the horizontal axis is YLF content, in the concentrations of no Yb:YLF, 5% Yb:YLF, and 10% Yb:YLF. On the vertical axis is fiber heating in change in temperature. As the concentration of Yb:YLF in the inner cladding increases, the average temperature for the whole volume of the fiber decreases. In some embodiments, the concentration of the cooling element, such as Yb:YLF can be increased to above 10%.

Figure 6:
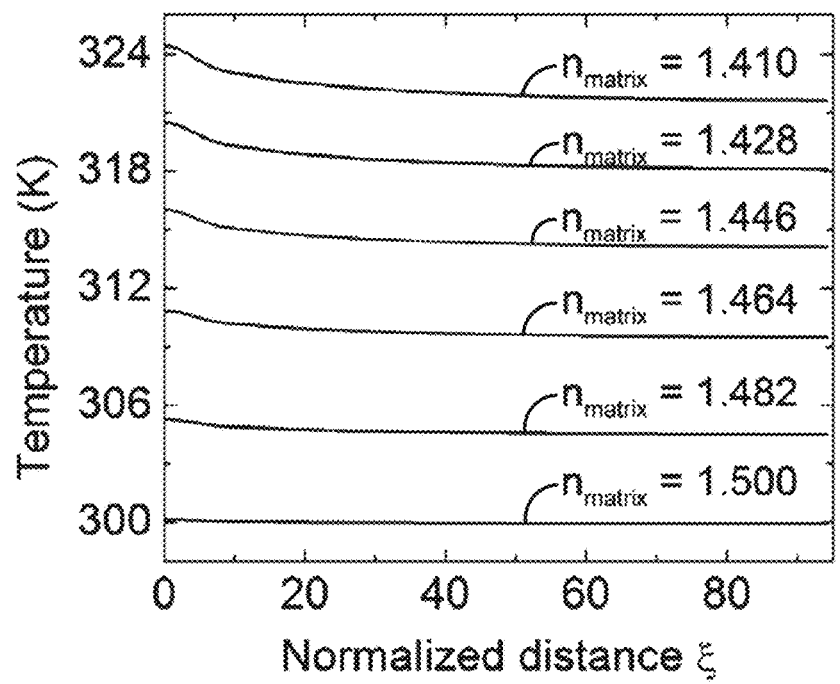
FIG. 6 is a graph of the radial temperature distribution of example fibers with various cladding glass refractive indices in accordance with the present technology.

FIG. 6 is a graph of the radial temperature distribution of example fibers with various cladding glass refractive indices in accordance with the present technology. On the horizontal axis is normalized distance. On the vertical axis is temperature. The temperature response to various cladding glass refractive indices ($n_{matrix}$) when 10% of Yb:YLF nanocrystals are doped within the inner cladding are plotted.

Effective medium theory may be used to calculate the effective refractive index of a composite material with 10% Yb:YLF—90% glass. The real and imaginary terms of the effective refractive index are defined as $$n_{eff} = [A+(A^2+B^2)^{1/2}]^{1/2}/2, \quad (21)$$

and $$k_{eff} = [-A+(A^2+B^2)^{1/2}]^{1/2}/2, \quad (22)$$

In one embodiment, the core index $N_{co}$ and Yb:YLF nanocrystal index $N_{YLF}$ are constants listed in Table 1. The real refractive index of the cladding glass $n_{matrix}$ was the only variable. In some embodiments, only the change in real refractive index is considered because the imaginary refractive index had negligible effect to the radial electric field distribution according as shown in FIG. 4E. The effective cladding refractive indices calculated with the above equations are listed in Table 2.

In one embodiment, the effective thermal conductivity of this inner cladding region layer was not considered because the fluoride thermal conductivity is similar to glass; and it is a very thin layer incorporated with nanocrystals compared to the entire cladding region without the nanocrystals. In this embodiment, it's reasonable to neglect the thermal conductivity variation for the heat transfer model, which considers the thermal properties of the entire fiber. However, in some embodiments, this thin layer is where the evanescent field is located. The optical properties of this region are important and the effective medium theory was applied to obtain a reliable EM-field distribution.

TABLE 2

Waveguide parameters: effective refractive indices and propagation constants

| $N_{matrix}$ | $n_{eff}$ | $k_{eff}$ | Propagation constant β |
|---|---|---|---|
| 1.4100 | 1.4162 | 3.5638E−07 | 9.0490 + 6.3301E−07i |
| 1.4280 | 1.4323 | 3.5262E−07 | 9.0703 + 7.0196E−07i |
| 1.4460 | 1.4485 | 3.4883E−07 | 9.0962 + 7.9586E−07i |
| 1.4640 | 1.4646 | 3.4499E−07 | 9.1288 + 9.4015E−07i |
| 1.4820 | 1.4809 | 3.4110E−07 | 9.1716 + 1.1776E−06i |
| 1.5000 | 1.4971 | 3.3783E−07 | 9.2325 + 1.6104E−06i |

To calculate the EM source and the resulting fiber temperature, the pumping beam was assumed to have the same transverse intensity profile as the guided mode. No matter how much the numerical aperture changes with the cladding index, the total power coupled into the beam is the same for fibers with different cladding indices. Thus the power density in the beginning of the fiber (z=0) should be normalized as $$\int_0^{\xi_s} \int_0^{2\pi} E(\xi', \phi', 0) \cdot E^*(\xi', \phi', 0) d\phi' d\xi' = \text{Irradiance} \quad (25)$$

When the $n_{matrix}$ is high, the effective $n_{cl}$ is close to the $n_{co}$. As plotted in FIG. 4B, more electric field power extends into the cladding layer. After the normalization, the power in the core is much lower than those with lower effective cladding indices, which means lower heat generated inside the core. This agrees with the calculated equilibrium temperature results in FIG. 6. When $n_{matrix}$ is small, the EM energy is confined more within the core due to the larger index difference between the core and cladding, and thus a higher temperature.

Figure 7:
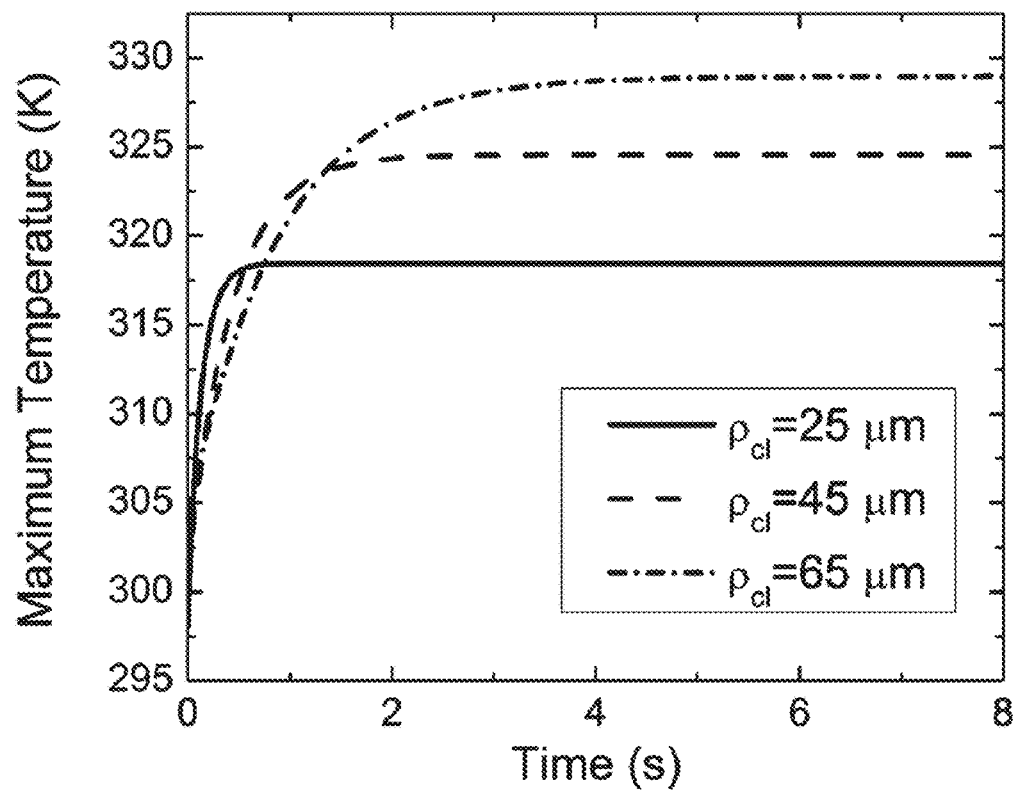
FIG. 7 is a graph of the time-resolved temperature for various cladding thicknesses of example fibers in accordance with the present technology.

FIG. 7 is a graph of the time-resolved temperature for various cladding thicknesses of example fibers in accordance with the present technology. On the horizontal axis is time in seconds. On the vertical axis is the maximum temperature. FIG. 7 shows the time dependent center temperature (=0) of the fiber as a function of cladding thickness. Clearly, as the cladding thickness increases, the overall temperature of the fiber increases. Longer times are required to reach steady state with increased cladding thickness. Ideally the cladding should be as small as possible, but sufficient thickness is needed to ensure satisfactory mechanical properties or a multi-mode pumped cladding configuration.

As used herein, the term "about" indicates a value can vary plus or minus 5%.

The embodiments of the invention in which an exclusive property or privilege is claimed are defined as follows:

1. A method of cooling an optical fiber, comprising impinging electromagnetic radiation from a laser on an optical fiber comprising:
    a core, in which the electromagnetic radiation is substantially confined; and
    a cladding, in thermal communication with the core, configured to provide optically activated cooling of the core via the electromagnetic radiation from the laser;
    wherein the cladding is a glass or a polymer and comprises a host material and an optically activated cooling material selected from the group of Yb:YLiF4, Yb:NaYF4, Yb:LuLiF4, Yb:KLuF4, and Yb:KYF4, wherein the optically activated cooling material is index matched to the host material.

2. The method of claim 1, wherein the electromagnetic radiation has a peak wavelength in a range of about 1020 nm to about 1064 nm.

3. The method of claim 1, wherein the optically activated cooling results from emission of upconverted, anti-Stokes photoluminescence in the cladding.

4. The method of claim 1, wherein the cladding is cooled greater than 15K.

5. The method of claim 1, wherein the optical fiber is a single-mode fiber.

6. The method of claim 1, wherein optical fiber is a portion of a core-pumped fiber-laser cavity.

7. An optical fiber configured to provide optically activated cooling, the optical fiber comprising:
    a core configured to substantially confine electromagnetic radiation from a laser;
    a cladding, in thermal communication with the core, configured to provide optically activated cooling of the core via the electromagnetic radiation from the laser;
    wherein the cladding is a glass or a polymer and comprises a host material and an optically activated cooling material selected from the group of Yb:YLiF4, Yb:NaYF4, Yb:LuLiF4, Yb:KLuF4, and Yb:KYF4, wherein the optically activated cooling material is index matched to the host material.

8. The optical fiber of claim 7, wherein the electromagnetic radiation has a peak wavelength in a range of about 1020 nm to about 1064 nm.

9. The optical fiber of claim 7, wherein the optically activated cooling results from emission of upconverted, anti-Stokes photoluminescence in the cladding.

10. The optical fiber of claim 7, wherein the cladding is cooled greater than 15K.

11. The optical fiber of claim 7, wherein the optical fiber is a single-mode fiber.

12. The optical fiber of claim 7, wherein optical fiber is a portion of a core-pumped fiber-laser cavity.

* * * * *